(12) United States Patent
Evans

(10) Patent No.: US 7,065,494 B1
(45) Date of Patent: Jun. 20, 2006

(54) ELECTRONIC CUSTOMER SERVICE AND RATING SYSTEM AND METHOD

(75) Inventor: Nicholas D. Evans, 2611 Lake Cove, Highland Village, TX (US) 75077

(73) Assignee: Nicholas D. Evans, Highland Village, TX (US)

( * ) Notice: Subject to any disclaimer, the term of this patent is extended or adjusted under 35 U.S.C. 154(b) by 0 days.

(21) Appl. No.: 09/344,795

(22) Filed: Jun. 25, 1999

(51) Int. Cl.
*G06F 17/60* (2006.01)

(52) U.S. Cl. .................... 705/10; 705/1; 705/8; 705/9; 705/14; 705/26; 705/40; 370/352; 370/248; 709/203; 709/217; 709/223; 709/225; 709/227; 379/114.01; 379/230; 379/29.01; 379/221.01; 379/229; 379/88.13; 707/10

(58) Field of Classification Search ............... 705/1, 705/7–10, 14, 26, 40; 370/352, 248; 709/203, 709/217, 223, 225, 227; 707/10
See application file for complete search history.

(56) References Cited

U.S. PATENT DOCUMENTS 6,037,934 A * 3/2000 Himmel et al. ............. 345/760

FOREIGN PATENT DOCUMENTS

JP 2002298001 A * 3/2001

OTHER PUBLICATIONS eBay. "The World's Online Marketplace." [online]. [retreived from the Internet on Dec. 6, 2001]. <http://www.ebay.com/> 1995-2001.*
PC World. "Don't Get Taken at Web Auctions."May 1999; PC World v17, n5, p27.*
Mannix, Margaret. "Who's Been naughty and Who's Been Nice." Sep. 27, 1999; US News and World Report v127 n12, p60.*
eBay Feedback Forum.http://cgi2.ebay.com/aw-cgi/eBayISAPI.dll?ViewFeedback &userid=hotrodsteele%40comcast.net.retrieved 30 Jun. 202 [online].*
The Wayback Machine. http://www.archive.org/ Retrieved Jun. 30, 2002 [online].*
Prince, Dennis L. "Online Auctions at eBay." Prima Publishing; Rocklin, CA Apr. 21, 1999. pp. 419-433.*

* cited by examiner

*Primary Examiner*—James A Reagan
(74) *Attorney, Agent, or Firm*—The Law Firm of H. Dale Langley, Jr., P.C.

(57) ABSTRACT

A method and system of receiving, storing, and delivering customer comments, including qualitative and quantitative feedback, over a communications network, such as the Internet. Also, the present invention relates to a method and system of rating and ranking companies, including individual merchants and both buyers and sellers, and their products and services based upon comments received and then awarding the companies points based upon their rating.

14 Claims, 32 Drawing Sheets

FIG. 8d

```
>>^^^^^^^^^^^^^^^^^^^^^^^^^^^^^^^^^^^^^^^^^^^^^^^^^^^^^^^^
>>
>>This message is to notify you that the following comments were
received
>>from Webmaster and are now posted for public viewing on the
>>YourComments.com site:
>>
>>Customer: Webmaster
>>Title: Test Comment
>>Rating: 1 - Strong Praise
>>Description: Test Comment
>>Entry Date: 3/23/99 1:03:45 AM
>>
>>These comments were received on the YourComments.com web site and
your
>>company will be ranked on the site in terms of the number and nature
of
>>comments received (both positive and negative).
>>
>>You may respond to these comments by going to the following address:
>>http://www.yourcomments.com/commentdetail.asp?comment_id=89
>>
>>IMPORTANT NOTE: This customer comment is directed to your company.
If you
>>feel you are not the appropriate contact to reply to this e-mail it
is
>>important that you involve the relevant customer service resource
from
>>your company and have them respond on the YourComments.com site at
the
>>address given above. Please do not hesitate to contact
YourComments.com if
>>you have any further questions about this service.
>>
>>BENEFITS FOR COMPANIES: To learn about the benefits YourComments.com
>>provides to companies, please visit the following address:
>>http://www.yourcomments.com/about.htm#Companies
>>
>>***********************************************************
>>Thank you for using YourComments.com!
>>
>>http://www.yourcomments.com
>>
>>
>
```

```
        To: Orlesia Duren@IP
      From: "Nick Evans" <nick@nevans.com>
        Cc:
       Bcc:
   Subject: STEP 14 - Fw: YourComments.com - Customer Service Alert
            (#89) -
Attachment: Headers.822
      Date: 4/5/99 10:12 AM
```

Here's step 14...

>-----Original Message-----
>From: compliment@yourcomments.com <compliment@yourcomments.com>
>To: webmaster@yourcomments.com <webmaster@yourcomments.com>
>Cc: webmaster@yourcomments.com <webmaster@yourcomments.com>
>Date: Tuesday, March 23, 1999 11:49 PM
>Subject: re: YourComments.com - Customer Service Alert (#89) - Test
Response
>
>
>>Dear Webmaster,
>>
>>DO NOT REPLY TO THIS MESSAGE. PLEASE RESPOND ON THE YOURCOMMENTS.COM
SITE
>>AS OUTLINED BELOW
>>*********************************************************
>>
>>This message is to notify you that you have received a reply from
>>YourComments.com and the reply is now posted on the YourComments.com
site:
>>
>>Company: YourComments.com
>>Title: Test Response
>>Entry Date: 3/24/99 12:37:18 AM
>>
>>This reply was received on the YourComments.com web site
>>
>>You may view this reply by going to the following address:
>>http://www.yourcomments.com/commentdetail.asp?comment_id=89
>>
>>*********************************************************
>>Thank you for using YourComments.com!
>>
>>http://www.yourcomments.com
>>
>>

TrustPoints

Home Enter Feedback View Feedback Ranking Search Help News/Chat Site Map

Feedback, Rating & Trust for E-Business ™

View Comments (Sample Page)

| Company | Rating | Subject | Username | Entry Date |
|---|---|---|---|---|
| Michele's Antiques | 1 - Strong Praise | Smooth transaction, good packing | antique1 | 4/4/99 12:12:12 AM |
| Michele's Antiques | 1 - Strong Praise | Quick, efficient and just as described | ebuyer | 4/3/99 2:04:20 PM |
| Michele's Antiques | 1 - Strong Praise | Excellent packaging! | boatfloat | 4/3/99 2:02:36 PM |
| Michele's Antiques | 1 - Strong Praise | Good communication, quick payment | eseller | 3/24/99 1:02:12 AM |
| Michele's Antiques | 1 - Strong Praise | Prompt, pleasant to do business | babyd | 3/23/99 1:03:45 AM |
| Michele's Antiques | 1 - Strong Praise | Fine transaction | mke | 3/22/99 11:09:27 PM |

Home Enter Comments View Comments Ranking Search Help News/Chat Site Map

YourCommer Logo

Thank you for using YourComments.com

Copyright © 1998-1999 *YourComments.com* All Rights Reserved.
Use of this Web site constitutes acceptance of the YourComments.com User Agreement. To read our Privacy Policy, click here.

*FIG. 9h*

Member of TrustPoints

*FIG. 9j*

ELECTRONIC CUSTOMER SERVICE AND RATING SYSTEM AND METHOD

FIELD OF THE INVENTION

The present invention generally relates to a method for the interaction between consumers and companies in the area of customer service, feedback and rating, more particularly, relates to systems and methods for the collection, storage, and analysis of information in a wide area communications network, such as the Internet.

BACKGROUND OF THE INVENTION

The customer service process has conventionally occurred by face-to-face contact. The current customer service process involves the use of telephone, fax, e-mail, pager and other mechanisms in an unstructured end-to-end process, which takes time on the consumer end and consumes both time and money on the company end due to the inefficiencies involved. Another problem with the current process is that oftentimes, a customer has to search to find the appropriate contact information for a company or organization and sometimes when they find the contact information, it's not guaranteed that this particular contact will be able to solve their problems. In fact, they may be referred to another individual within the company; thus the cycle begins again. The increase in computer ownership and in widespread use of the Internet, makes feasible the collection of information, for example, customer comments, via computer networks and related communication networks.

Additionally, the majority of information on the web today is qualitative—text, discussion forums, and other information that is hard to rapidly analyze and act upon. The full potential of the web as a real time quantitative knowledge acquisition and processing tool for businesses, organizations and even consumers has yet to be realized.

SUMMARY OF THE INVENTION

The present invention permits the receiving, storing, and delivering of customer comments, including qualitative and quantitative feedback, related to companies and their products and services. Also, the present invention relates to a method and system of rating and ranking companies (including individual merchants and both buyers and sellers) and their products and services based upon comments received and then awarding the companies points based upon their rating.

A particular embodiment of the present invention relates to a method of providing customer service interactions via a communication network comprising: receiving a comment about a company or the company's products and services from a consumer of the company; storing the comment; sending notification to the company that the comment has been received; and providing access to the comment via the communication network. In the present invention, a comment is an qualitative and quantitative evaluation of the company or the company's products and services, wherein the evaluation may be any combination of remarks, statements, criticisms, complaints, compliments and suggestions.

Another aspect of the method further comprises: receiving a query from the company and forwarding the comment to the company; receiving a response to the comment from the company; storing the response from the company; sending a notification to the consumer that a response has been received; and providing access to the response via the communication network.

Another aspect of the method even further comprises: rating a plurality of companies based upon a plurality of comments received from a plurality of consumers; assigning a value to each comment; compiling the values of comments received for each company; ranking the plurality of companies based on the compiled values; and providing access to company ratings and rankings via the communication network.

In another embodiment, the present invention further comprises: sorting the comments based on comment type; assigning numeric values to each comment; compiling comments by adding the numeric values for each comment type and for each company; and providing access to the compiled comments via the communication network.

Another embodiment of the present invention relates to a method of providing customer service interaction via a communication network comprising: providing a database that serves to relate queries with preprogrammed responses in the form of data entry forms and stores information entered into the data entry form; delivering queries to the database over the communication network; accessing data entry forms relevant to the queries; inputting data to the data entry forms; and storing the data in the database.

Another embodiment of the present invention is a system for providing a customer service intermediary between at least one consumer communication device and a company communication device across a communication network, comprising:

a processor;

a memory device coupled to the processor;

a communication device coupled to the processor and the memory device, that enables communication via the communication network;

a database that is stored and updated in the memory device; and an application program that is executed by the processor from the memory device comprising:

first code, responsive to a query from the consumer communication device via the communication device that instructs the communication device to send a data entry form to the consumer communication device;

second code, responsive to receiving a data entry form back from a consumer communication device via the communication device that stores a comment from the data entry form into the database; and third code, responsive to receiving the data entry form back from a consumer to communication via the communication device that instructs the communication device to send a notification of the comment to the company communication device.

Another embodiment of the present invention is a method of providing a rating mechanism of companies and their products and services via a communication network comprising: providing a website and enabling access to the website via the communication network; enabling registration at the website wherein a company registers for membership in a points-based program; receiving a comment about a company or the company's products and services from a consumer of the company; rating the company based upon the comment; awarding points to the company or the company's products and services based upon level of rating; and ranking the company or the company's products and services based upon level of rating.

The points-based program of the present invention further comprises evaluating each comment a company receives and rating the company according to a numerical scale. The comments are each given a numerical value and the sum of these numerical values becomes the company's ranking. The company is awarded points based on the sum of the numerical values. The company's rating or ranking may be viewed by the communication network.

This points-based program provides an online rating and ranking system based upon consumer feedback about online and offline merchants. The rating mechanism of the present invention can be implemented with the method of enabling customer service interaction of the present invention or it can exist on its own. The points-based program includes rating of seller feedback based on various types of criteria and it also includes the capability of rating buyers as well as sellers and of rating individuals, such as sellers on Amazon and eBay, auctions who do not have their own websites, as well as companies that have their own websites and are typically considered as online merchants. Once a buyer has completed a sale on a website, for example, after making an online purchase, the buyer may be automatically directed to a web page where he or she can comment on the seller regarding the specifics of their transaction.

The points-based program provides a universal rating system for anyone who buys and/or sells on the Internet. This points-based program covers and is applicable to all classified, auction or e-Commerce sites. Unlike the eBay feedback mechanism, this site is a stand-alone, and it is not embedded into other websites, i.e., it can collect feedback from many different websites. In fact, the program can even collect feedback about traditional merchants who do not have an online presence. The ratings are provided by consumers who are customers of the merchants.

Embodiments of the present invention will add value to both the consumer and company. For the consumer, the present invention will give a "Power of the Press" effect by ranking companies based on the comments it receives from consumers. Secondly, it provides one place for consumers to go to initiate the customer service interaction instead of making numerous calls or searching for addresses. The value businesses will receive is the opportunity for free publicity; ability to reduce customer service costs; and the ability to display a logo on their website to demonstrate their commitment to quality customer service and membership in the rating program. In addition, the present invention provides a more streamlined, standardized process for efficient customer service interaction by providing a dynamic, data-driven website that acts as an intermediary between consumers and companies. The present invention will improve the quality of customer service worldwide, develop standards for customer service interaction, simplify the process of getting customer service for consumers, and reduce customer service costs for companies.

As used herein, "company" refers to commercial entities, online and offline buyers, sellers and individuals, and "consumer" refers to customers and online buyers or sellers. The terms "company" and "consumer" are interchangeable in the case of online auctions or classifieds, where a seller may comment on a buyer and a buyer may comment on a seller. This present invention's rating mechanism is available to those companies that may or may not have websites of their own.

Finally, embodiments of the present invention incorporate business rules that prevent abuse of the customer service and rating method. For example, the points-based program will only include feedback from registered users towards the rating by validating registered user e-mail addresses, etc. The feedback is tied to a specific transaction, for example, a transaction number, and is given more weight in the points-based program than feedback that does not tie back to any transaction. Therefore, the rating and ranking system of the points-based program places greater emphasis on feedback that pertains to a specific verifiable transaction as opposed to miscellaneous feedback that cannot be tied to a particular transaction. The program also places greater emphasis on feedback that comes from registered users who can be authenticated and have verifiable e-mail addresses.

BRIEF DESCRIPTION OF THE DRAWINGS

Figure 8D:
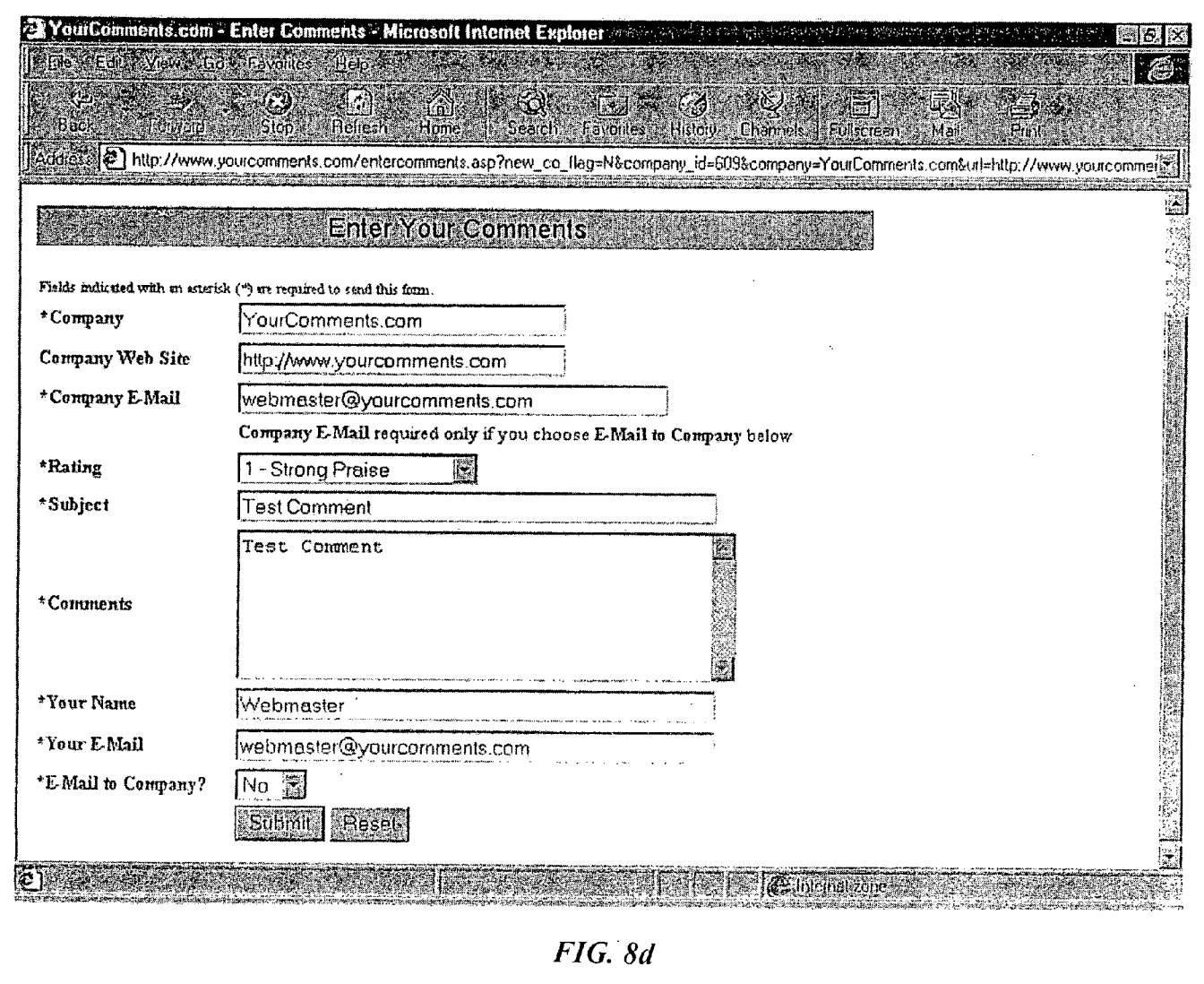
Figure 8H:
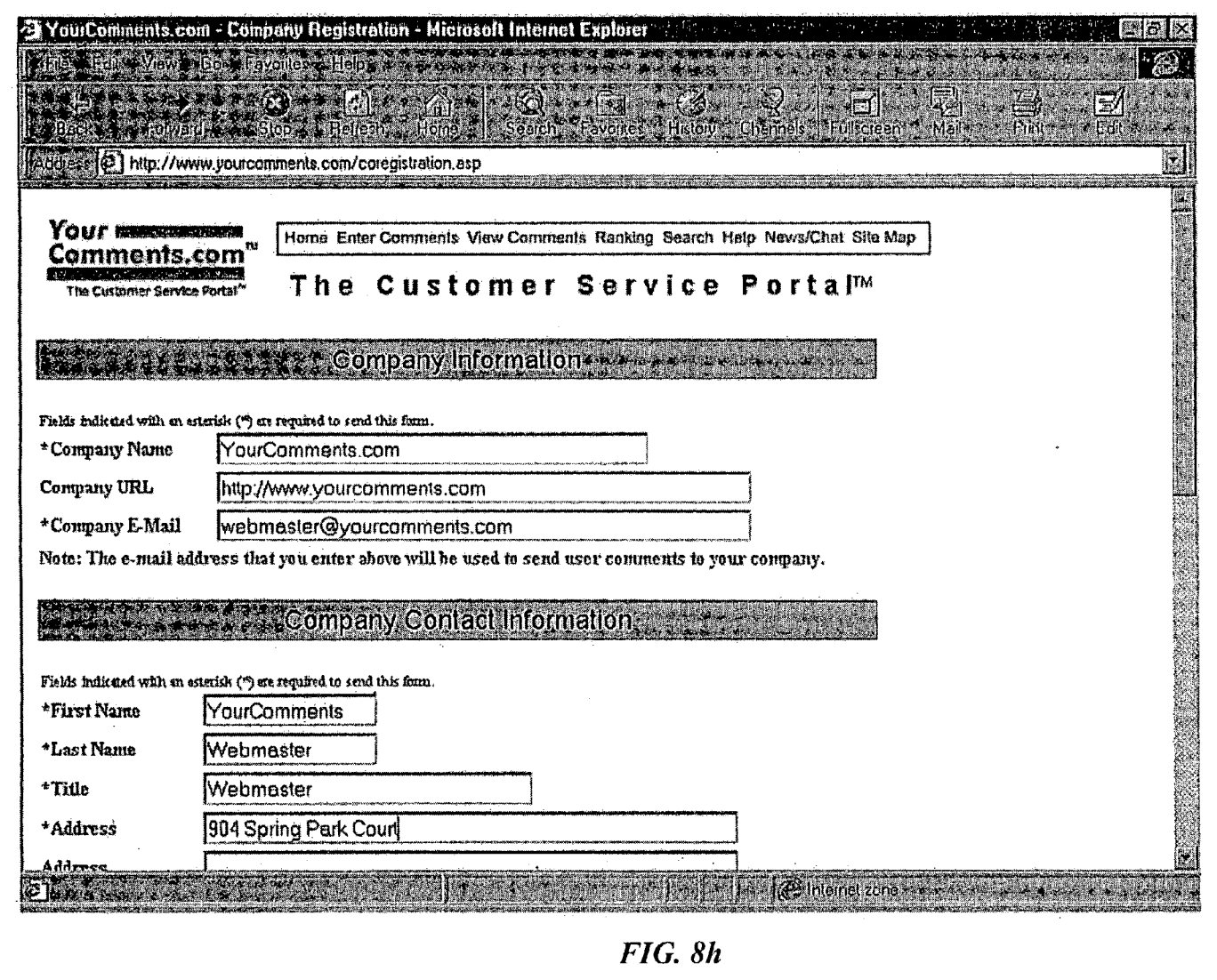

FIGS. 8a–8n are an exemplary series of screen captures accessible to a user performing the method of FIG. 2.

FIG. 8a is a display of a web page that prompts the consumer to select the company name and enter comments.

FIG. 8d is a display where the consumer enters a comment.

FIG. 8g is a display of a sample e-mail notification to the company.

FIG. 8h is a display of the registration page for companies.

FIG. 8l is a comment detail page, which lists both the comment and the response.

FIG. 8m is an example of an e-mail notification that is sent to the consumer.

FIG. 8n is a web page showing the company rankings.

Figure 9C:
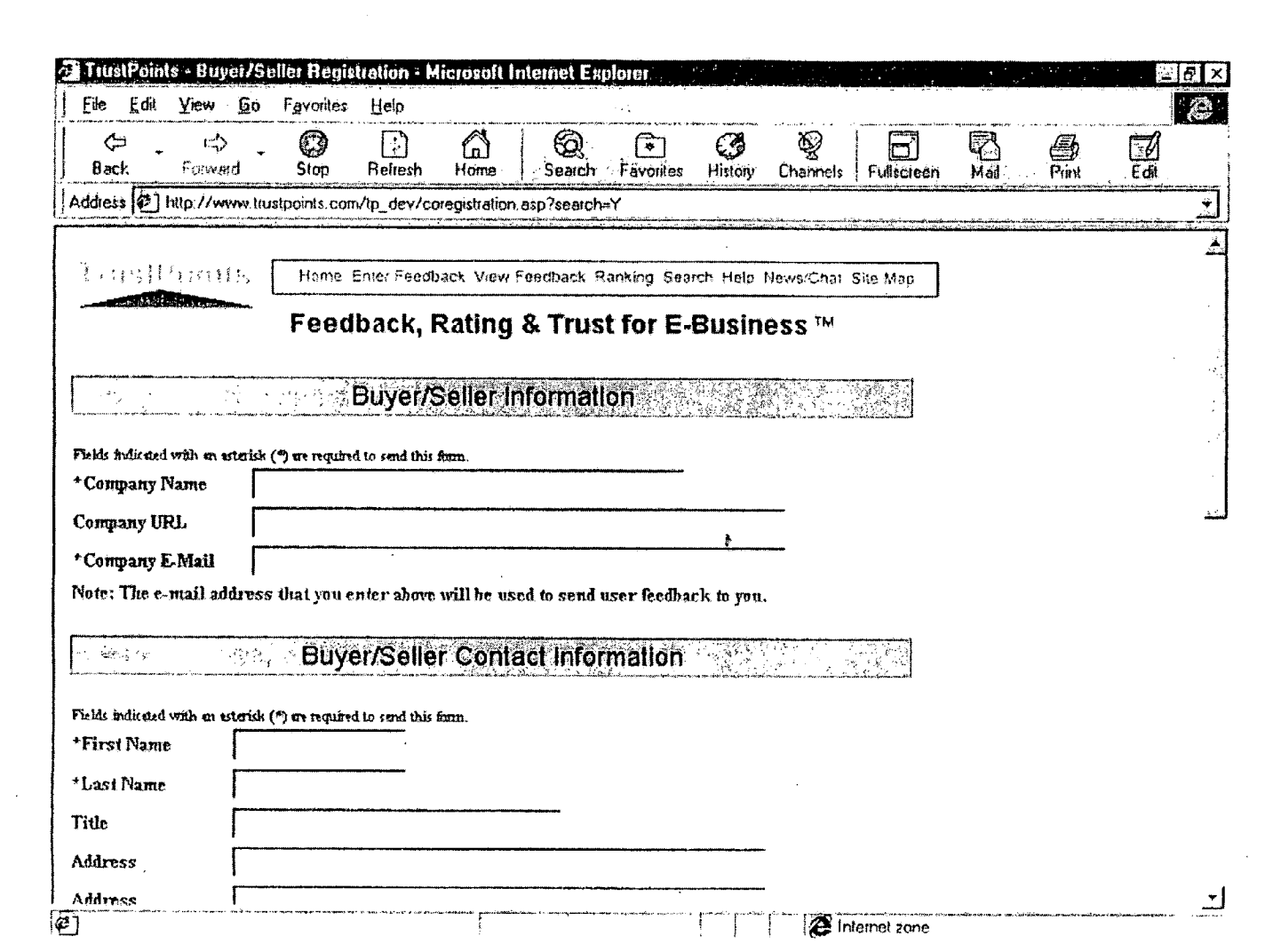

FIGS. 9a–9i are an exemplary series of screen captures of the points-based system according to an embodiment of the present invention.

FIG. 9a is a web page that explains how to become a member of the point-based program.

FIG. 9b is a web page that displays company and user registration information

FIG. 9c is an example of the online registration form.

FIG. 9d is a web page display where a member can view and/or edit its profile information.

FIG. 9e is a web page that displays membership status while the application is still in process and prior to check being approved.

FIG. 9f is a web page that illustrates how once the membership has been activated, the member may download the TrustPoints™ member graphic on its company website, web page, or auction or classified listing.

FIG. 9g is an exemplary of a web page that shows the validation that a company receives once it becomes a member of the point based program.

FIG. 9h is a web page that displays comments a member of the points-based program, such as, TrustPoints™ has received and it displays a member's rating.

FIG. 9i is a depiction of a buyer or seller's home page within the points-based program.

FIG. 9j is a display of the logo that is located within the website of a points-based program member.

DETAILED DESCRIPTION

The herein described embodiment relates to the use of electronic mail (e-mail) via the Internet.

Figure 1:
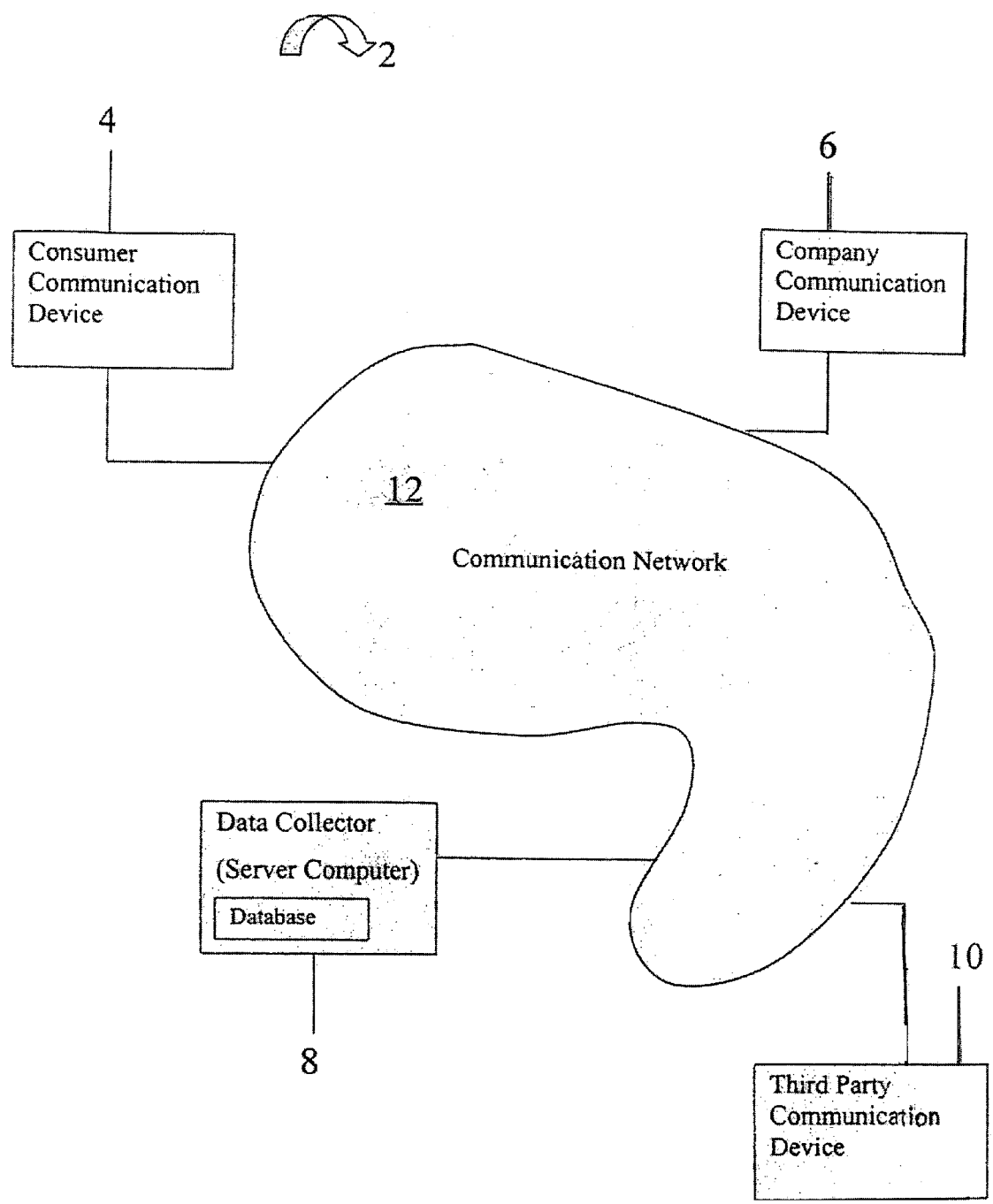
FIG. 1 is a block diagram of a communication network according to an embodiment of the present invention.

Referring to FIG. 1, a system for implementing the customer service and rating method includes one or more communication networks 12 and various devices coupled to the networks 12 for communicating therewith, such as a consumer communication device 4, company communication device 6, data collector 8, and third party communication device 10. In this particular embodiment of the present invention the communication devices are personal computers. The network can be any type of communications network, such as the Internet, intranet, extranet, a local area network (LAN), a wide area network (WAN), or some other interconnected communication system. Communications over the network 12 follow one or more protocols or formats, such as TCP/IP, some other IP protocol, some other packetized data protocol, or even some other digital or analog data or messaging format.

The connected devices of the network 12 include a data collector 8. The data collector 8 is a server computer. The data collector 8 is integrated with a database, either software or hardware, for storing, manipulating and providing data and communications mechanism, which is received by the data collector 8 from other devices connected to the network. The server computer database 8 may be a relational database management system such as, Oracle, SQL Server, or Sybase, an object database or some form of Extensible Markup Language (XML) storage medium, including simple XML files. Rather than a server computer, the data collector 8 may alternatively be any switch capable of transmitting and receiving information, including hardware and/or software capable of such functions.

According to an embodiment of the present invention, the data collector 8 is connected to a consumer communication device 4. The consumer communication device 4 is a personal computer. The consumer communication device 4 is capable of interacting with the data collector 8 by requesting and receiving communications served up by the data collector 8 over the communication network 12. Additionally, the consumer communication device 4 is capable (through a user, person or entity) of inputting and transmitting communications to data collector 8 over the communication network 12. Instead of a personal computer, the consumer communication device 4 can alternatively be any other network enabled device which can communicate with the data collector 8, such as a personal digital assistant, some other computer, a messaging pager, or other. As those skilled in the art will know and appreciate, both the data collector 8 and the consumer communication device 4 must in any event be capable (either themselves or with the assistance of other software or hardware) of communicating there between over the network 12.

Also, according to an embodiment of the present invention, the data collector 8 is also connected over the network 12 with one or more participant devices. One such participant device is a company communication device 6, and it is capable of interacting with the data collector 8. Another participant device is a third party communication device 10. The third party communication device is also capable of interacting with the data collector 8 by requesting and receiving communications served up by the data collector 8 over the network 12 and is capable (through a user, person or entity) of inputting and transmitting communications to the data collector 8 over the network 12. The third party communication device 10 may also alternatively be any other network enabled type of device that can communicate with the data collector 8, for example a personal digital assistant, some other computer, a messaging pager or other software or hardware communications device. As those skilled in the art will know and appreciate, the data collector 8 and the third party communication device 10 must in any event be capable (either themselves or with the assistance of other software or hardware) of communicating there between over the network 12, although the company communication device 6 and consumer communication device 4 need not necessarily be capable of communicating with the third party communication device 10 (or vice versa).

In certain embodiments, the data collector 8 of the system 2, for example a server computer, maintains a graphical interface such as a world wide website on the network 12, for example the Internet, which is accessible to the consumer communication device 4 and the company communication device 6. The consumer communication device 4 and the company communication device 6 are each capable of accessing and viewing the graphical user interface, for example via web browsers such as Microsoft's Internet Explorer™, or Netscape's Navigator™, operating at the consumer communication device 4 and the company communication device 6, respectively. The consumer communication device 4 and the company communication device 6 must each be able (either themselves or through assistance of other software or hardware) of allowing the user or participant persons or entities as applicable to provide input data via the graphical user interfaces at the consumer communication device 4 and company communication device 6 respectively to the data collector 8 over the network 12.

The server computer 8 includes several modes of interaction, two of which are "real time" and "delayed". The server computer 8 is flexible in that it can switch between real-time and delayed modes. For example, if the interactions start out in "real-time" mode and it is determined that the comment cannot be responded to in "real-time mode", the system will then switch to "delayed" mode for the company response. The server computer 8 may also gather company contact information in batch or real-time mode from company websites in Hypertext Markup Language (HTML) META tag or XML format. In "delayed" mode, the consumer's comments are stored in the server computer database 8 and are forwarded to the company, often via e-mail, for the company to respond to at a later time.

In "real-time" mode, the consumer enters the company name and the server computer performs a search. The server computer 8 searches the company's customer service contact information in real-time via the system's database 8 or by connecting to the company's website and looking up published customer service contact information and mode of interaction preferences posted using HTML META tags within HTML files or via XML elements within XML documents. The server computer 8 then couples to the consumer communication device 4 with the company communication device 6 through its customer service representative using this preferred communications channel.

Additionally, the server computer 8 may perform some monitoring functions, which may include recording response times. After the customer service interaction, the consumer, through a consumer communication device 4, may also complete a real-time survey of customer satisfaction via an HTML form or any other type of form.

Figure 2:
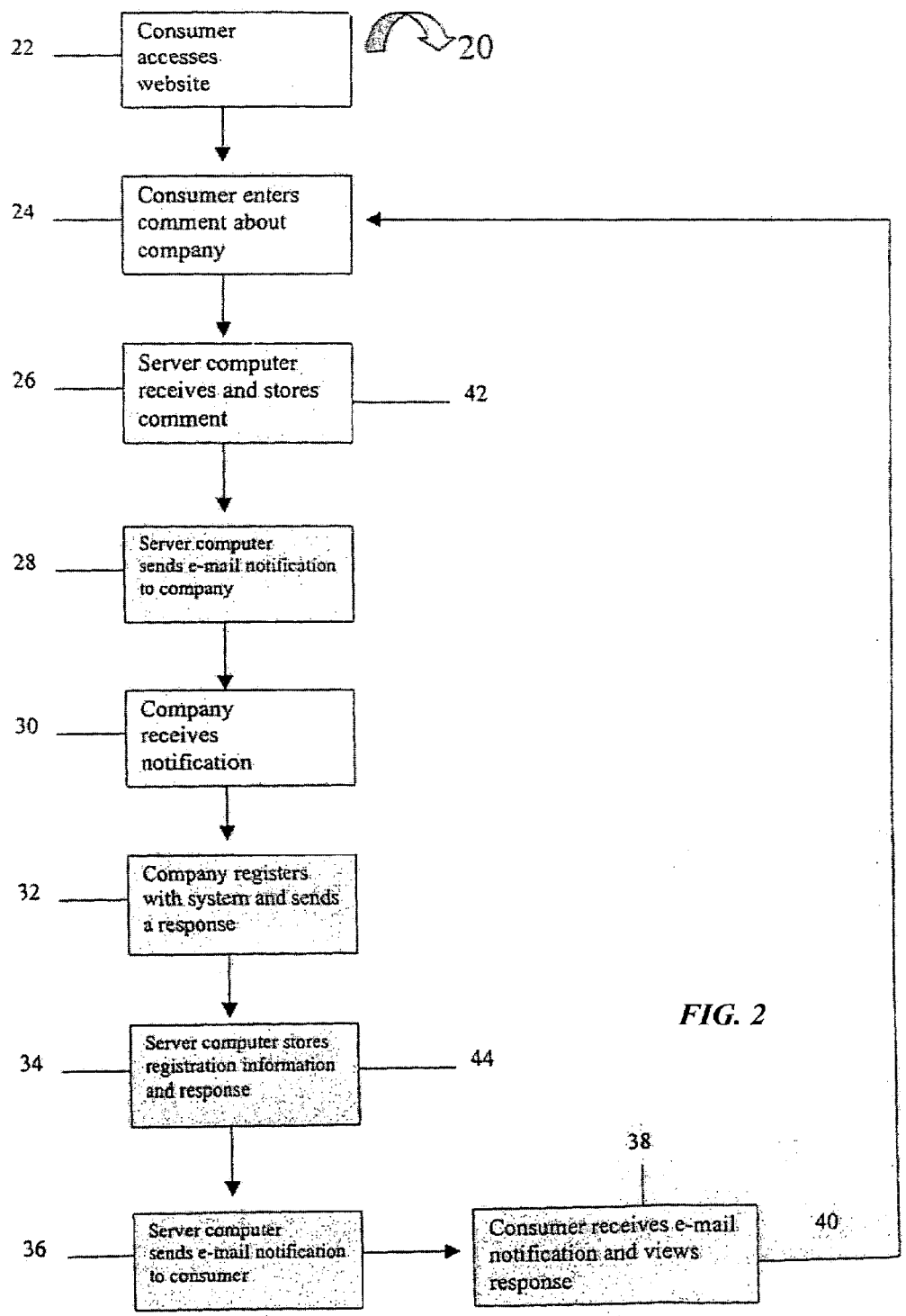
FIG. 2 is a flow diagram of a customer service interaction process according to an embodiment of the present invention.

Referring to FIG. 2, a method of customer service interaction 20 commences with a user or, more specifically a consumer, accessing a website, for example, the YourComments.com website. However, this example is just an embodiment of the present invention and is not limited to the YourComments.com website, and the present invention may be implemented with other websites. Step 24 includes the consumer choosing a company by inputting the company name and/or company website address requesting a search and then selecting a company name from the result set. Also, the consumer (user) enters preferred modes of communication, a comment about the company chosen, a rating of the company or the company's products and services, and optionally, contact information on a data entry form, such as HTML. Those skilled in the art will recognize that the HTML embodiment is just one of the several types of data entry forms that can be used. Other data entry forms include JAVA Applet or Active X control. Contact information includes e-mail addresses, live chat contact information, phone numbers, fax numbers, pager numbers and any other contact information necessary for the customer service interaction to occur. After the consumer enters a comment and rating of the company or the company's products and services, the server computer 8 receives and stores the data at step 26. The server computer 8 also posts the comment on the website at step 42 for public or private viewing; and sends an e-mail notification to the company at step 28. When the company receives e-mail notification at step 30, it has the option of responding to the comment. If the company chooses to respond, according to an embodiment of the present invention, it will first register at the website at step 32, if not already registered, and then enter a response at step 32. If the company is already registered, then the company logs in at step 32 by supplying a username and a password and then enters a response at step 32. The server computer 8 receives the registration information and response and stores the registration information and response at step 34. The server computer 8 also posts the response over the network communication 12 for public or private viewing at step 44. Then the server computer 8 sends an e-mail notification to the consumer at step 36. The consumer receives the notification and views the response at step 38. This process can continue until the customer service interaction has been conducted to the satisfaction of both parties.

In another embodiment of the present invention, companies may enter their own contact information if it does not already exist within the system database. The information is entered via an HTML form or other form on the system website or via an automated Electronic Data Interchange (EDI) transaction or automated web-based transaction that updates the system database. The company may also update information that already exists within the system. The system can extract company information stored on the company's website by reading HTML META tags or XML files. This can be done either prior to the customer service inquiry through regularly scheduled automated process or in real-time to respond to a specific customer service inquiry. Also, third parties, acting on behalf of the company may also enter company contact information and update information. Information is entered the same way as discussed in the above-mentioned embodiment.

In another embodiment of the present invention, the comment may be forwarded to the company and the response may be forwarded to the consumer through other forms of notification, such as automatic placement of a telephone call, fax or pager notification. Data may be transferred using the XML standard and Document Type Definitions (DTDs) specific to the customer service and feedback/rating information being exchanged so that the company may process it using computer(s) and separate the content (the actual data) from the presentation. Data may be transferred to the company via the public Internet, via an extranet, or via another communication channel.

Figure 3:
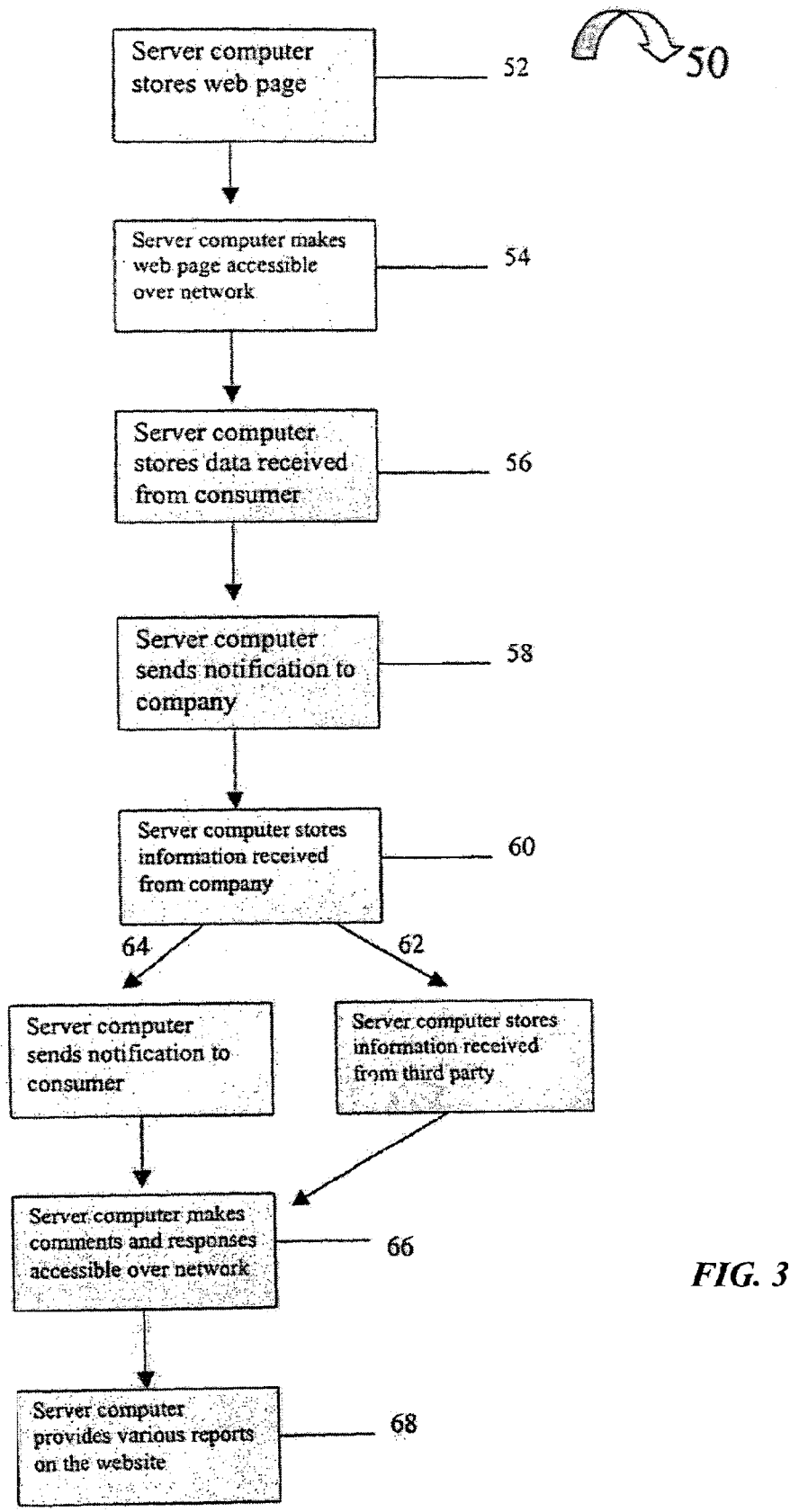
FIG. 3 is a flow diagram of the database storage process according to an embodiment of the present invention.

Referring to FIG. 3, the process of storing information on the server computer 50, commences with the server computer 8 storing the web page at step 52. In this embodiment, the web page is YourComments.com. In a step 54, the server computer makes the web page, for example the YourComments.com web page, accessible over the communications network 12 described in FIG. 1. After a consumer enters preferred modes of communication, company name, subject (including product or service), comments, rating, and consumer username and password the server computer 8 stores the information in its database 8 at step 56. Next, in step 58 the server computer 8 sends an e-mail notification to the company. The server computer 8 uses a sequence of e-mail addresses in order to contact the company. First, it tries the customer service e-mail address (if any), then the webmaster e-mail address (if any), and then the word "webmaster" followed by the company domain name—e.g. webmaster@xyz.com. If a company has previously registered with the system website then all these e-mail addresses will be present and correct. If the company chooses to respond to the consumer comment, it will enter customer service contact information, preferred modes of communication and response, the server computer 8 will then perform step 60. In addition, a third party may submit customer service contact information. If that occurs, the server computer 8 will store the information it receives from the third party at step 62. The server computer 8 then sends an e-mail notification to the consumer at step 64. After receiving a comment(s) and response(s), the server computer 8 makes them accessible over the communication network 12 at step 66 for public or private viewing. In addition, the server computer 8 may provide various reports for consumer and company, as well as for public or private viewing on a website, for example the YourComments.com website at step 68. Examples of such reports include rankings of companies based upon the level of comments received, the number of comments received, the response time between comment and response, and other criteria.

Figure 4:
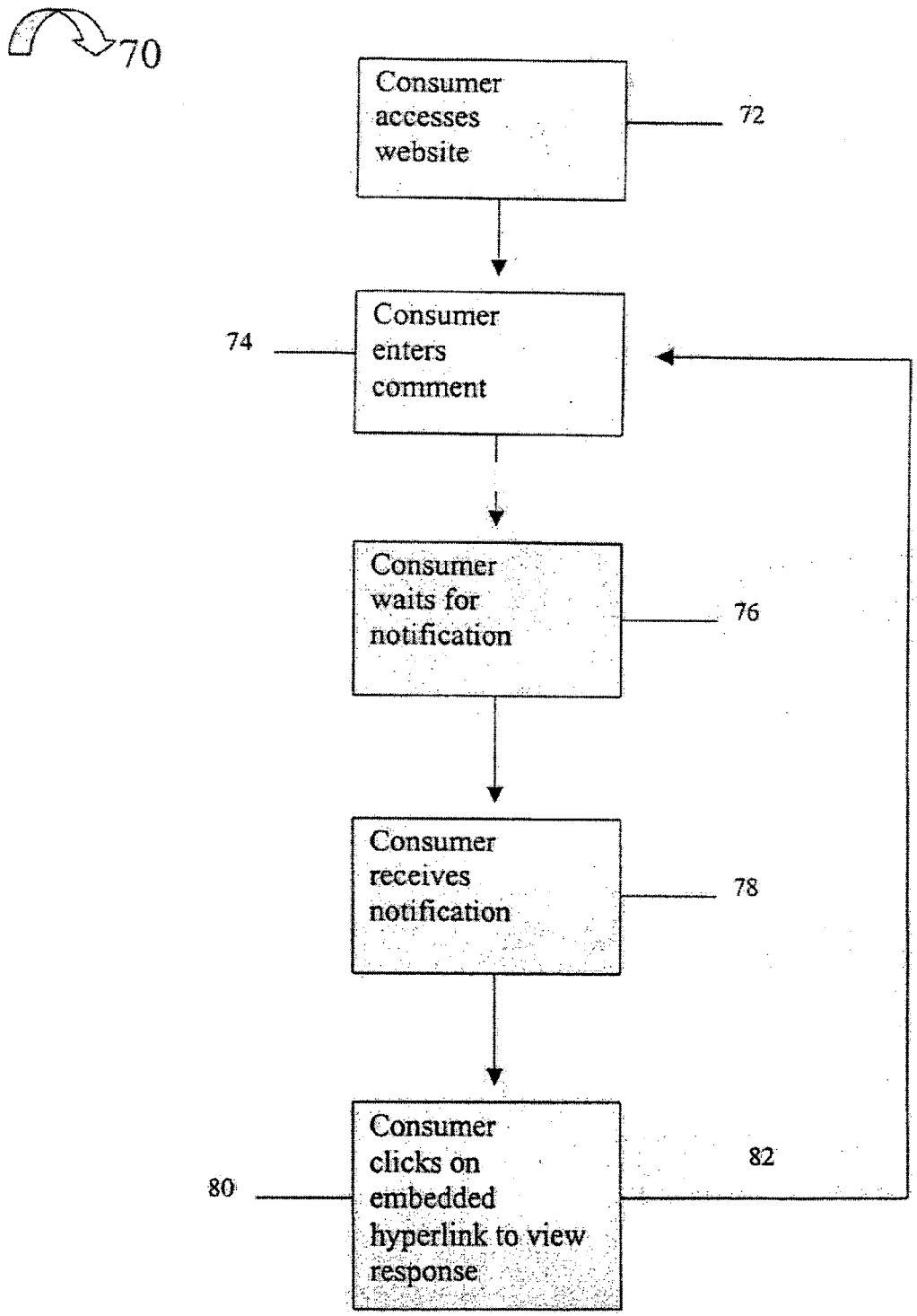
FIG. 4 is a flow diagram of the consumer interaction process according to an embodiment of the present invention.

Referring to FIG. 4, a flow diagram is shown illustrating a consumer interaction process 70. According to an embodiment of the present invention, a consumer communication device 4 couples to the server computer 8 by accessing a website, for example YourComments.com, at step 72. In an embodiment of the present invention, in order for the comment to be forwarded to the comment to the company, the consumer must have already registered with the system by providing at the minimum a name (first and last) and e-mail address; and in order for the system to post the comment, the consumer provides username and password. Anonymous users may post comments but those comments are not included in the company rankings and such comments are not forwarded to the company. Then the consumer enters preferred modes of communication, contact information, and a comment at step 74. The consumer also enters a rating along with the comment by choosing the nature of the comment, i.e. remark, statement, compliment, criticism, feedback, or suggestion. The rating is based on a rating scheme such as 1 to 5 stars (worst to best) or a positive, neutral or negative rating. The consumer then waits to receive a response from the server computer 8 at step 76. Once the server computer 8 receives a response from the relevant company, the consumer then automatically receives an e-mail notification from the server computer at step 78. The consumer clicks on an embedded hyperlink within the e-mail notification at step 80. The hyperlink accesses the website and allows the consumer to view the response via an HTML page. The consumer may then choose to enter another comment at step 82 and start the process over again.

Figure 5:
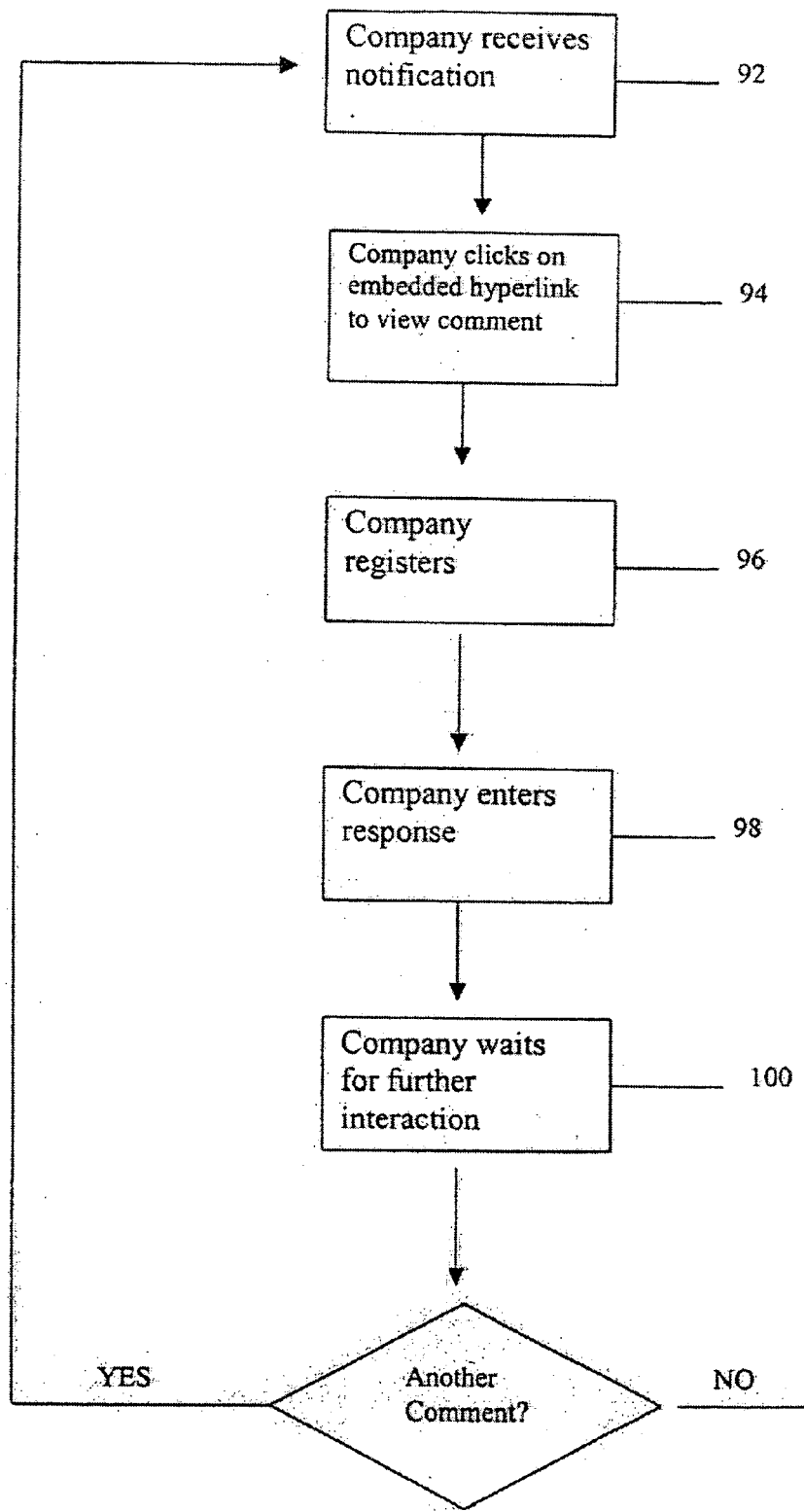
FIG. 5 is a flow diagram of the company interaction process according to an embodiment of the present invention.

Referring to FIG. 5, a flow diagram is shown illustrating a company interaction process 90, according to an embodiment of the present invention. The company first receives an e-mail notification from the server computer 8 at step 92. Once the company receives the notification, it may respond via the same method of notification or via a notification method requested by the consumer. For example, if the notification is via an e-mail message, the company can retrieve the comment by clicking on an embedded hyperlink within the e-mail notification at step 94. The hyperlink accesses a website, for example, YourComments.com, displays the appropriate comment, and allows the company to enter its response via an HTML form or any other data form. The company then registers at the website at step 96 if it chooses to respond. Some of the information the company submits is subject, response, company representative name, and company representative e-mail address. After registering, the company enters a response at step 98. The company then waits for further interaction with that particular consumer at step 100. If the consumer enters another comment, the company will then get another notification from the server computer 8 at step 92 and may then enter another response at step 98.

Figure 6:
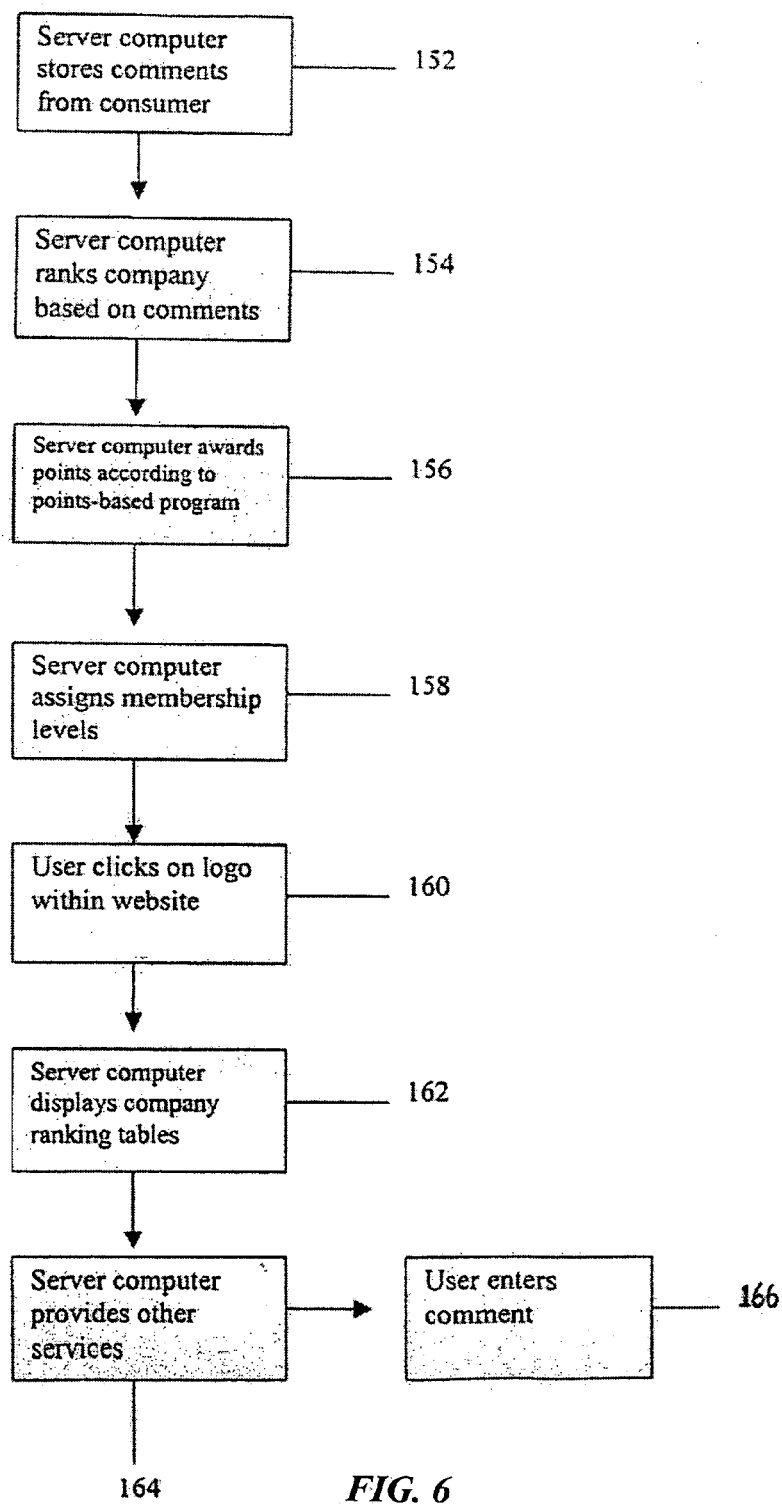
FIG. 6 is a flow diagram of the rating mechanism process according to an embodiment of the present invention.

Referring to FIG. 6, the system of FIG. 1 also provides a rating mechanism 150 such as a points-based program and system. The server computer 8 stores the comments received from consumers at step 152 and then ranks the company based on the level of comments received at step 154. In this particular embodiment, the company is then awarded TrustPoints™ ("points") based upon the feedback the company receives at step 156. The points-based system consists of the sum of the comments received about the company based on a numerical scale. In this embodiment, the numerical scale is between negative ten (−10) and positive ten (+10). Membership levels are then assigned based upon the number of points the company receives at step 158. For example, according to this embodiment of the present invention, the different levels are: 1) Rookie: 0–99 points, 2) Bronze: 100–249 points, 3) Silver: 250–499 points, 4) Gold: 500–999 points, and 5) Platinum: 1000+ points. In order for the server computer 8 to display the rating of a particular company, according to this embodiment of the present invention, a user clicks on the YourComments.com logo or the TrustPoints™ logo within the company web page, website, auction or classified listings at step 160. The server computer 8 may optionally display company rating and ranking tables at step 162. The server computer 8 may also provide other services to online merchants, such as directory listings, full-page descriptions of their business, image hosting, and hyperlinks to their current auction sites and classifieds at step 164. A user may also enter feedback about the company by clicking on a hyperlink within the web page at step 166.

Figure 7:
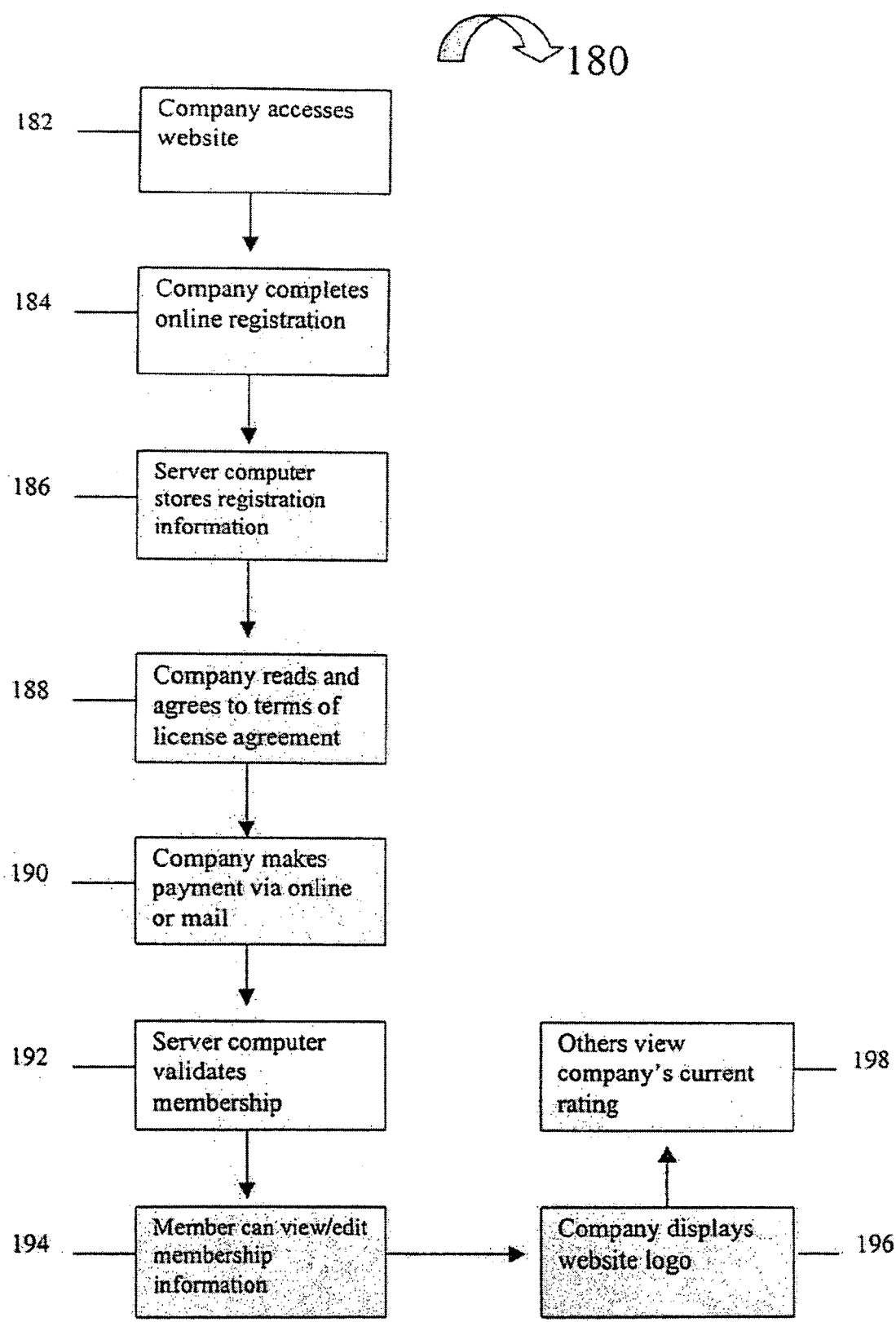
FIG. 7 is a diagram according to an embodiment of the present invention of how a company obtains membership into the points-based program.

Referring to FIG. 7, the process for applying for membership into the points-based program 180, for example, TrustPoints™, of this particular embodiment of the present invention commences with the company accessing a website, such as the YourComments.com or TrustPoints.com website, at step 182 and completing an online registration form at step 184. The information obtained from the registration form includes company customer service contact information, company name, URL (if any), and e-mail address. The server computer 8 stores this information in its database at step 186. The company reads and agrees to the terms of the license agreements at step 188. The company pays for membership either by entering credit card information online or mailing in the registration form along with payment at step 190. Once payment is received, the system activates the membership and displays the fact that the company is a member of the program at step 192. Once a company has become a member, it may login to the YourComments.com or TrustPoints.com website and view and/or edit personal membership information at step 194. The company also displays the YourComments.com or TrustPoints.com logo within their web page, website, auction or classified postings at step 196. Others are allowed to click on the logo to access the company's current points rating at step 198.

In another embodiment of the present invention, computer(s) may receive the comment/response on behalf of the company/consumer in a format such as extensible markup language (XML). The computer(s) may do some pre-processing and storage of the information prior to contacting the necessary company customer service representative/consumer or even re-contacting the company for additional information. Responses may be either human input or machine generated. In yet another embodiment, responses may be entirely computer driven.

The server computer database stores company customer service contact information, optionally, consumer contact information, and the preferred modes of interaction (communication) between consumer and company.

Figure 10:
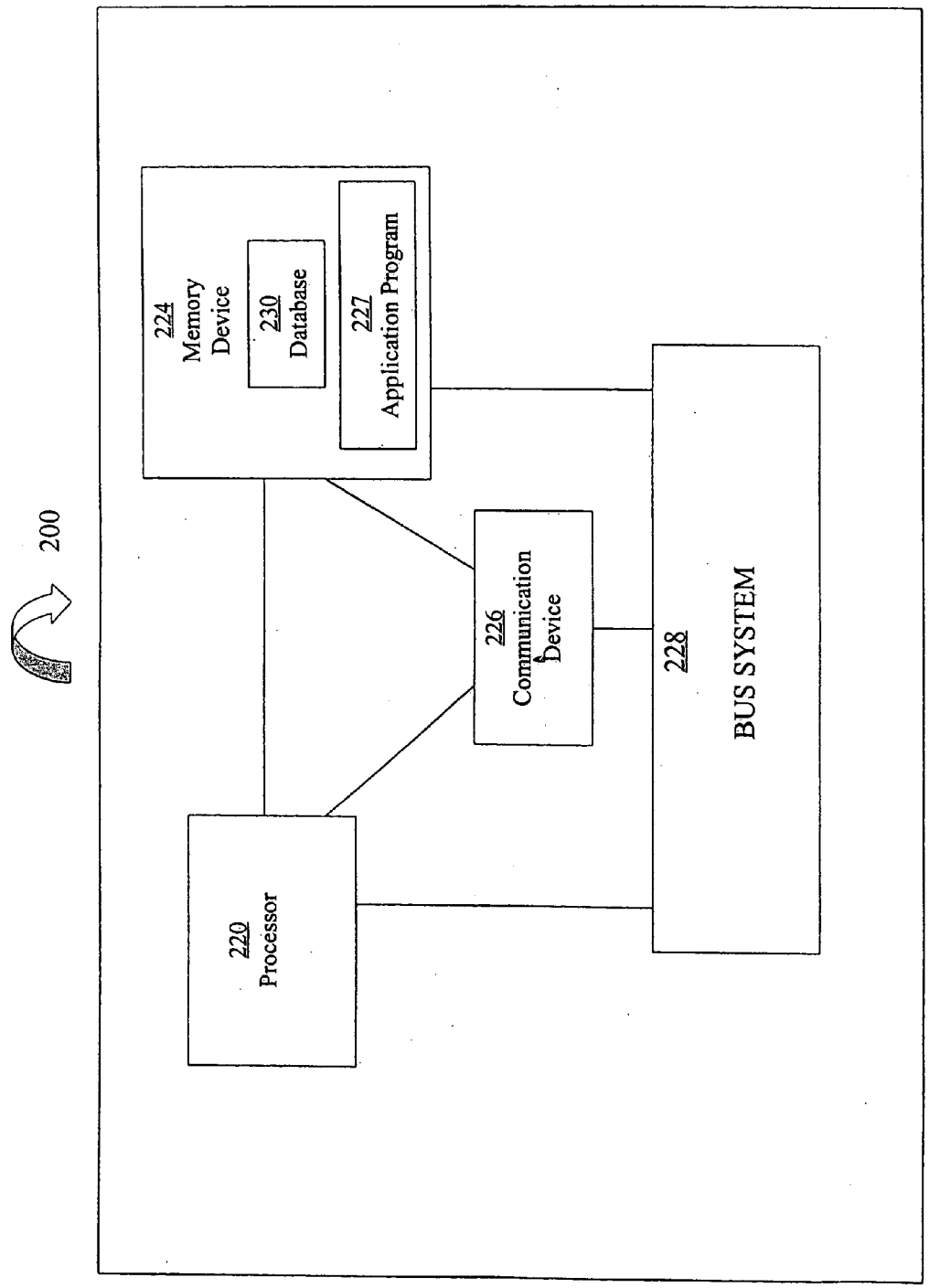
FIG. 10 is a block diagram of components of a communication network according to an embodiment of the present invention.

Referring to FIG. 10, a system for providing a customer service intermediary 200, includes at least one consumer communication device 4 and a company communication device 6 from FIG. 1 across a communication network 12 (see FIG. 1). The system 200 comprises a processor 220, a memory device 224 coupled to the processor 220, and a communication device 226, which is coupled to the processor 220 and the memory device 224. The communication device 226 enables communication via the communication network 12. The system also includes a database 230 that is stored and updated in the memory device 224 and an application program 227 that is executed by the processor 220 from the memory device 224. The system further comprises a bus system 228. The bus system 228 is coupled to the processor 220, memory device 224, communication device 226 and application program 227.

The application program 227 comprises codes necessary for the customer service interaction that is described in FIG. 2. In an embodiment of the present invention, the application program includes a first code which is responsive to a query from the consumer communication device 4 via the communication device 226 that instructs the communication device 226 to send a comment data form to the consumer communication device 4. It also includes a second code which is responsive to receiving the comment data form back from the consumer communication device 4 via the communication device 226 that stores the comment from the data form into the database 230, and a third code that is responsive to receiving the comment data form back from the consumer communication device 4 via the communication device 226 that instructs the communication device 226 to send a notification of the comment to the company communication device 6.

The database 230 stores comments from the consumers and responses from the companies. The database 230 may be a relational database management system. The database 230 also maintains a graphical interface such as a world wide website on the network 12 which is accessible to the consumer communication device 4 and the company communication device 6.

EXAMPLES

Figure 8A:
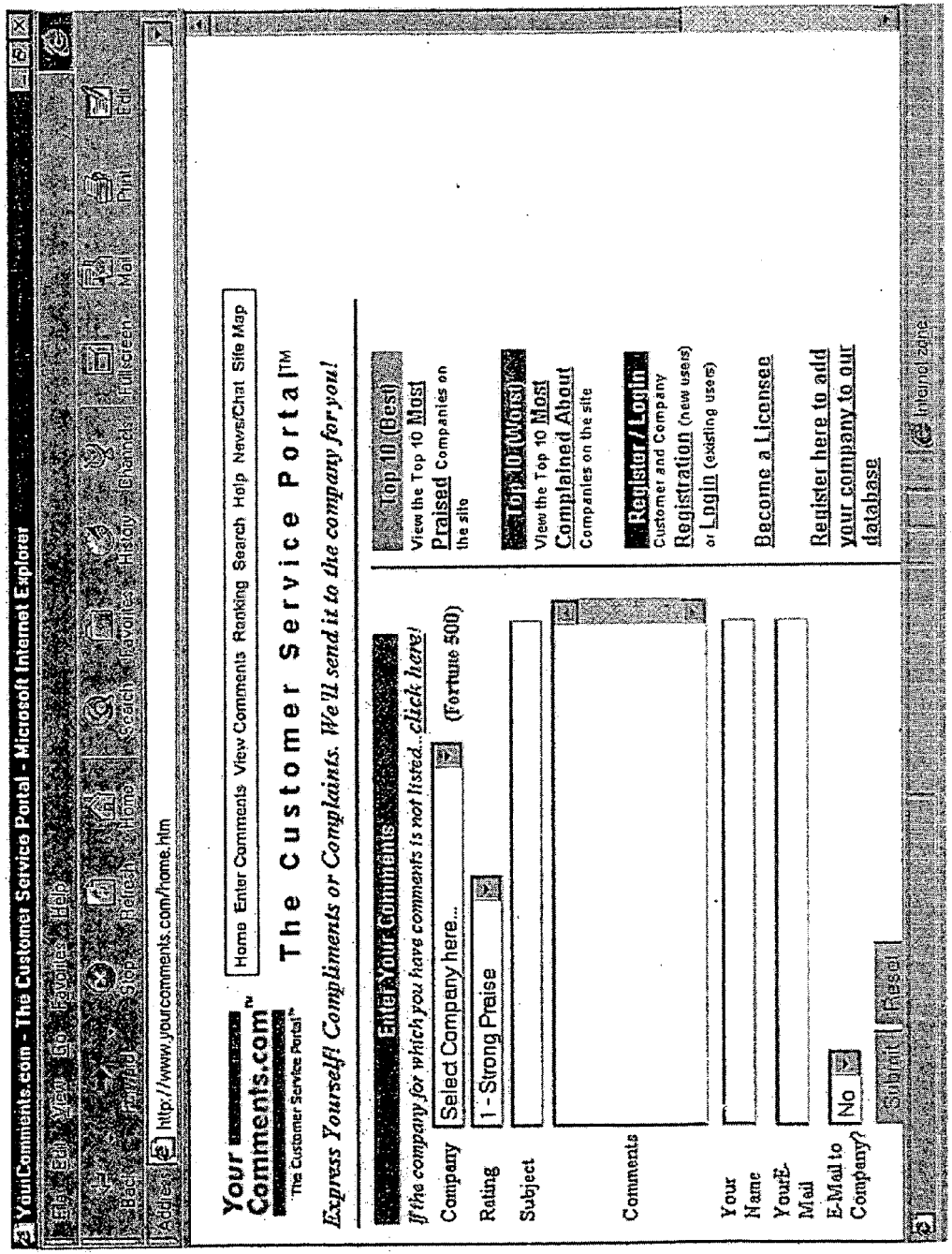
Figure 8B:
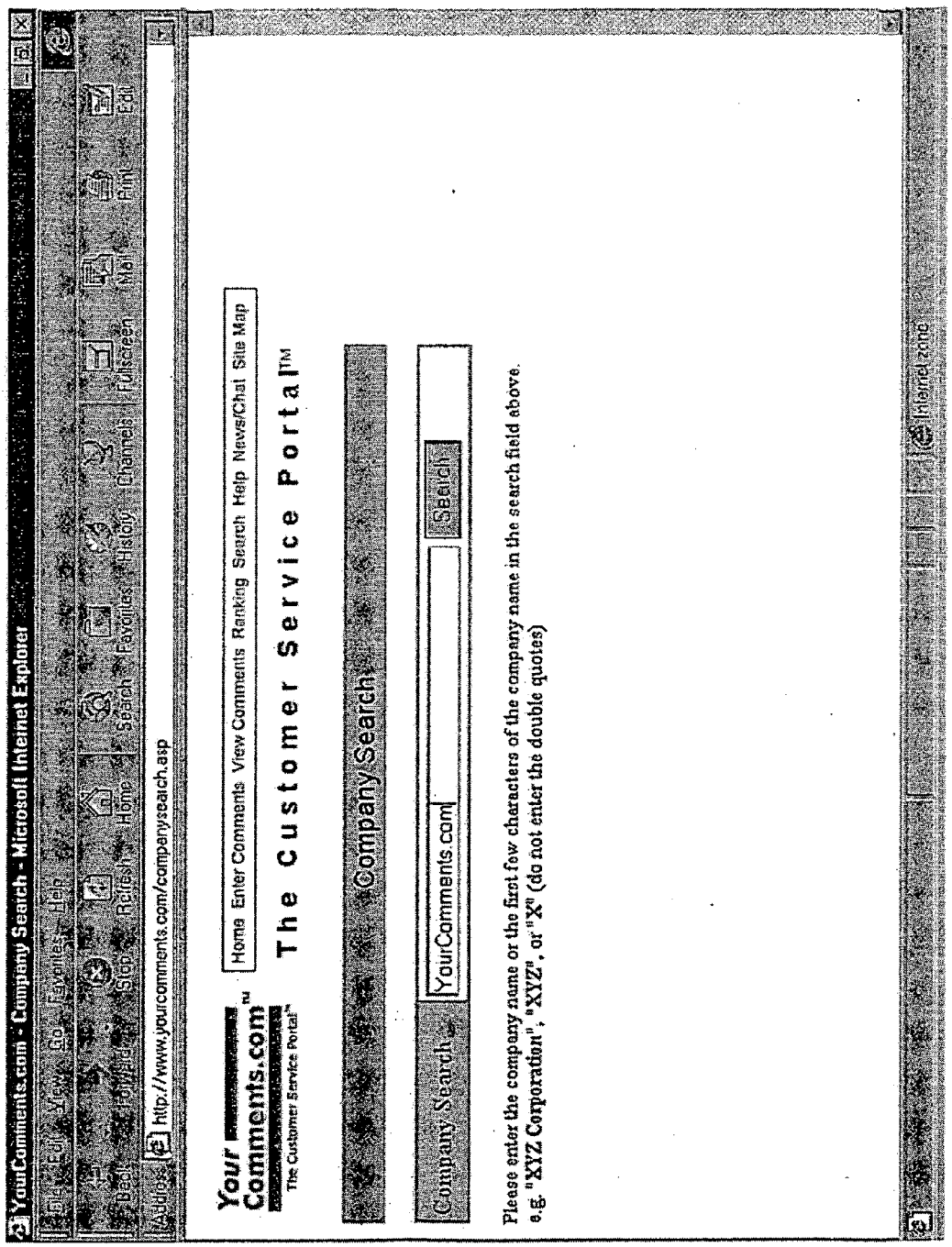
FIG. 8b is a display of a web page that prompts the consumer to enter a company name to search for within the server computer database.
Figure 8C:
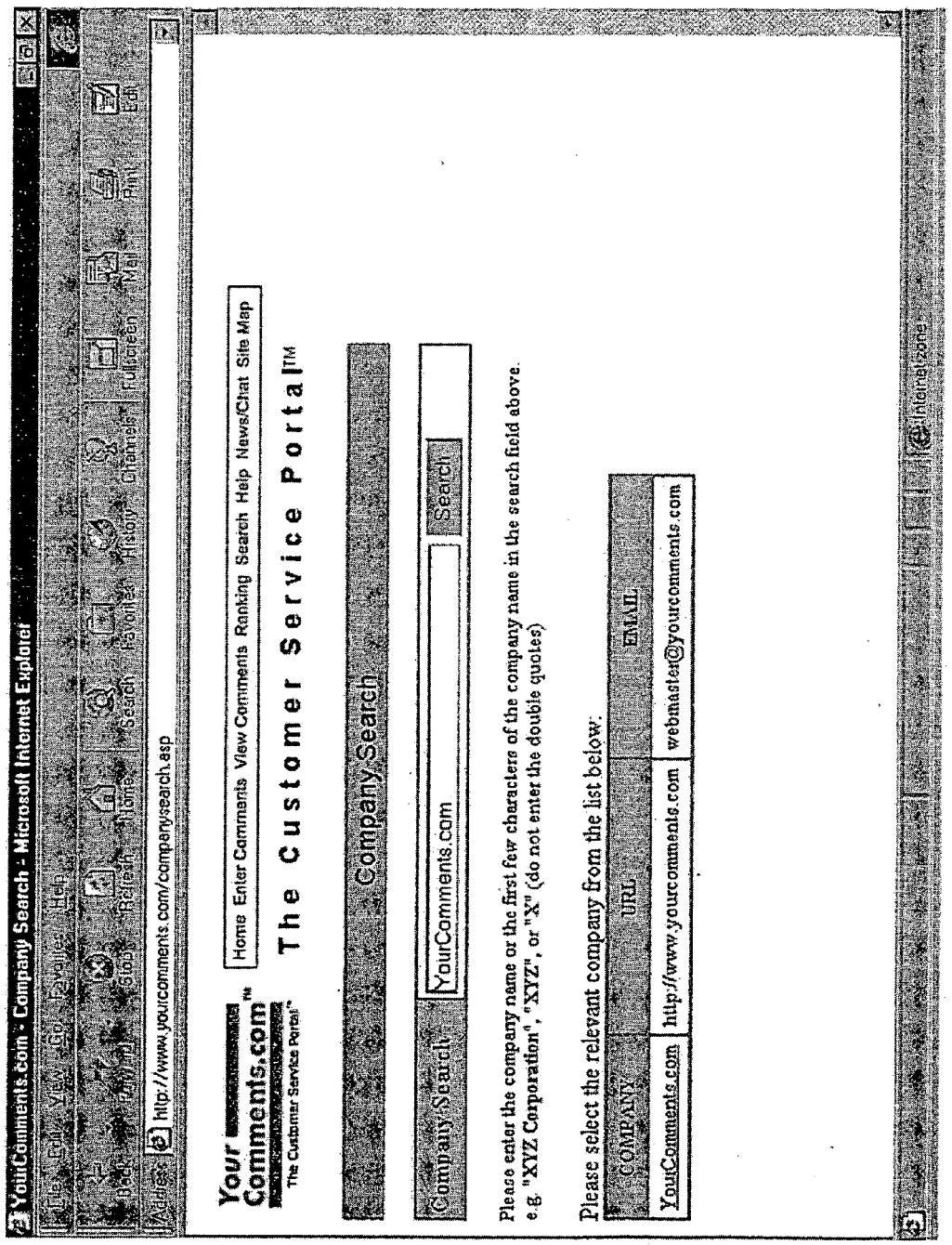
FIG. 8c is a display of a web page that allows the consumer to select the appropriate company name from the search results.
Figure 8E:
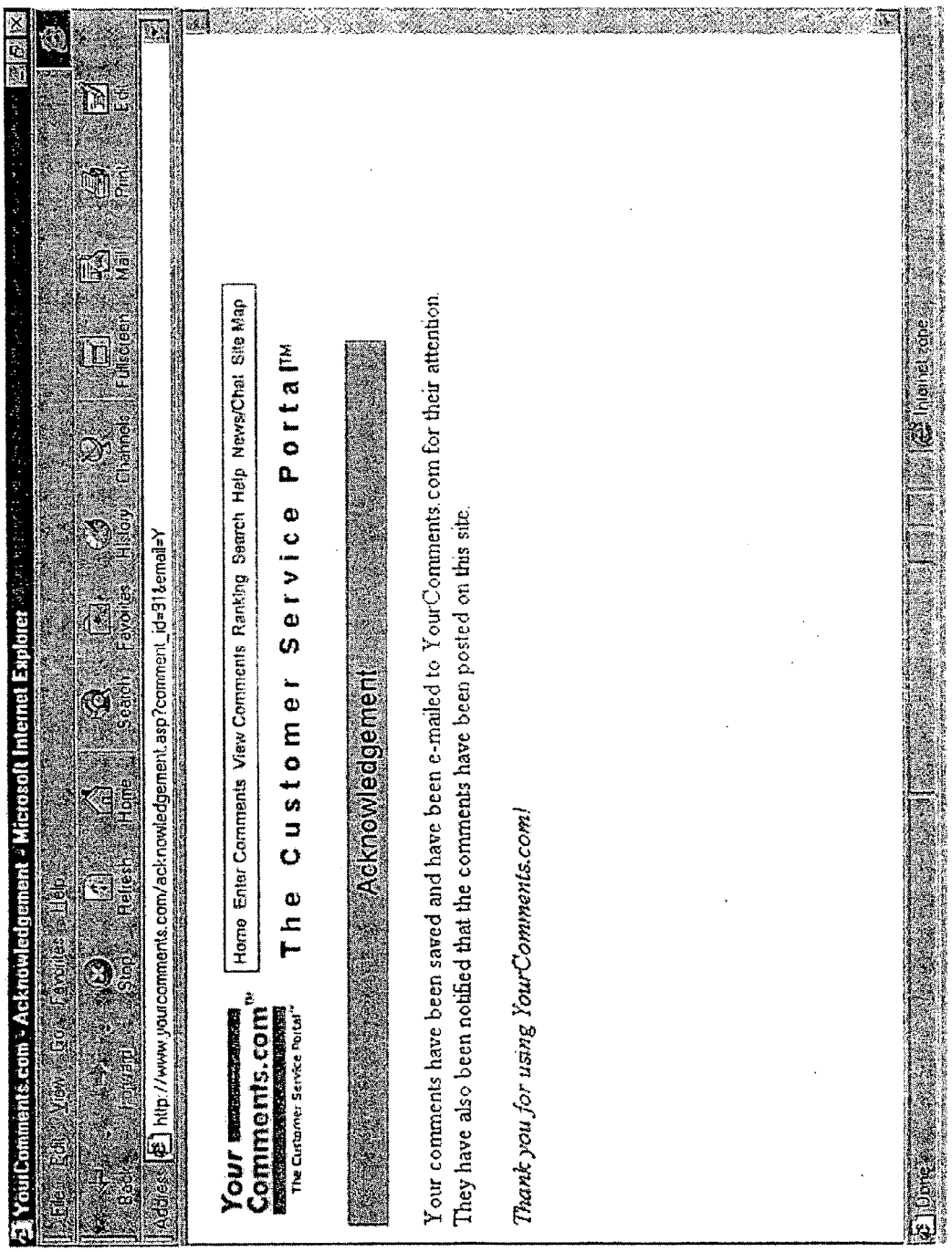
FIG. 8e is a display of an acknowledgement page that is displayed after a consumer submits a comment.
Figure 8F:
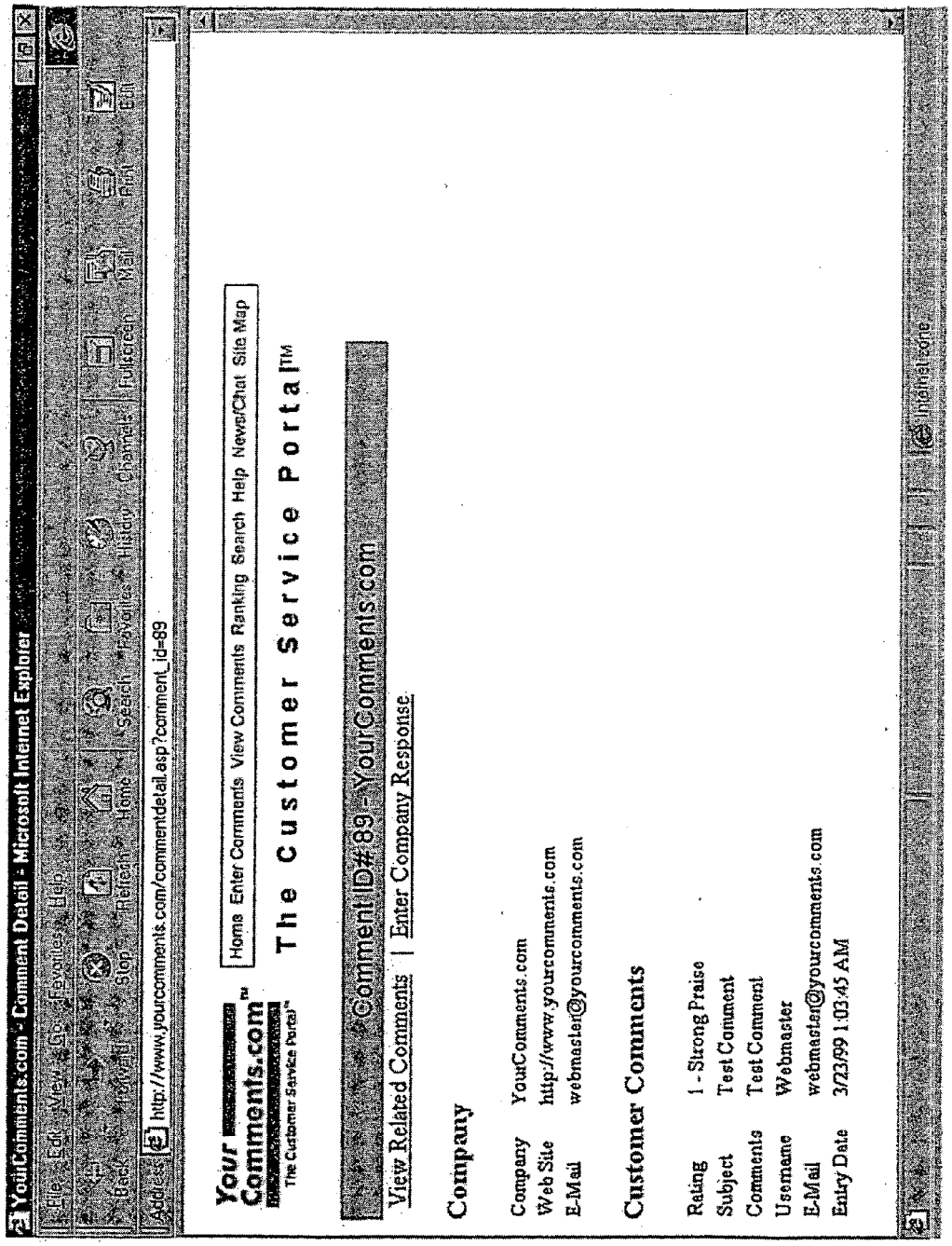
FIG. 8f is a display of the comment detail page.

An example of implementation of the customer service interaction follows:

Referring to FIGS. 8a–8n are screen captures that appear at a particular computer, such as the consumer's or company's prompting for information or providing a status. First, a consumer accesses the YourComments.com website as shown in 8a to submit a comment. In one embodiment referring to FIG. 8d, a consumer enters the following information: company name, rating, subject, comments, user name, user e-mail address, and whether consumer wants to send an e-mail to the company. Referring to FIG. 8b, a consumer may also search for the company by entering the first few characters of the company name. A search results list is then posted and consumer then selects the appropriate company as illustrated in FIG. 8c. Then, FIG. 8d appears for the consumer to submit comment(s). Referring to FIG. 8e, an acknowledgement page is sent to inform the consumer the comment has been sent via e-mail to the relevant company. Referring to FIG. 8f, a comment detail page is automatically redirected to the consumer, which may contain company contact information and consumer's comments.

Figure 8I:
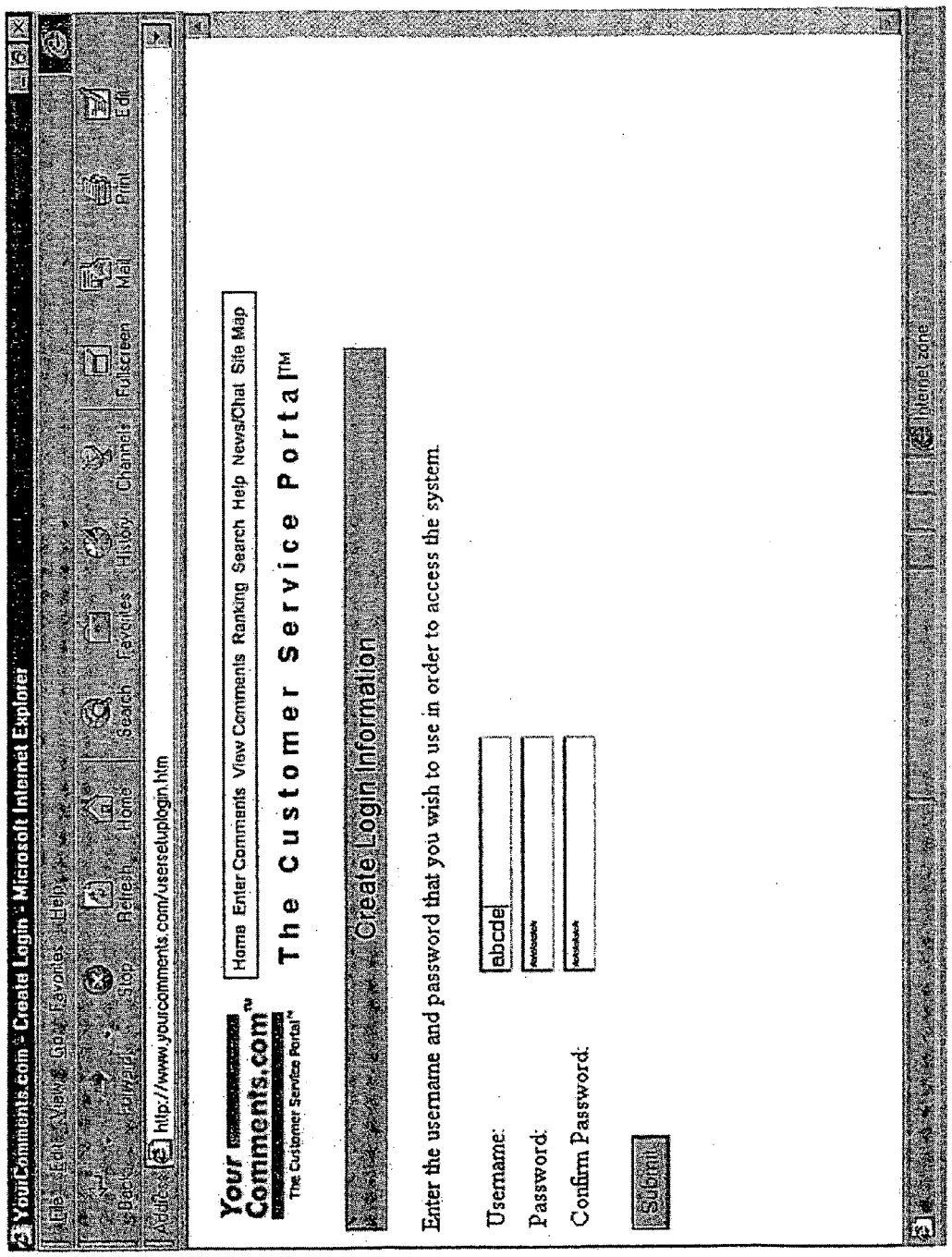
FIG. 8i is a display of the web page where the company enters its choice of username and password.
Figure 8J:
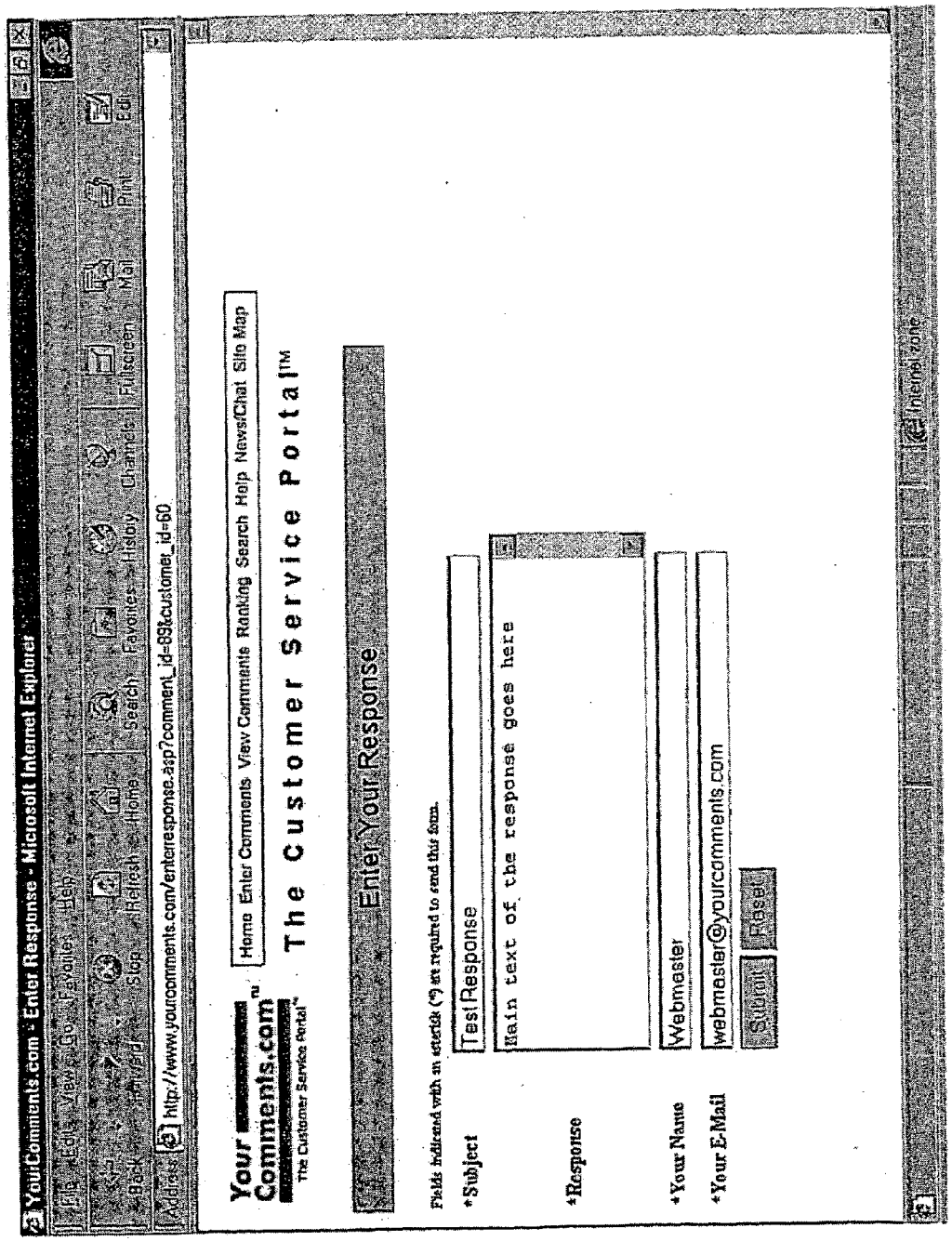
FIG. 8j is a display of the web page where the company enters a response.
Figure 8K:
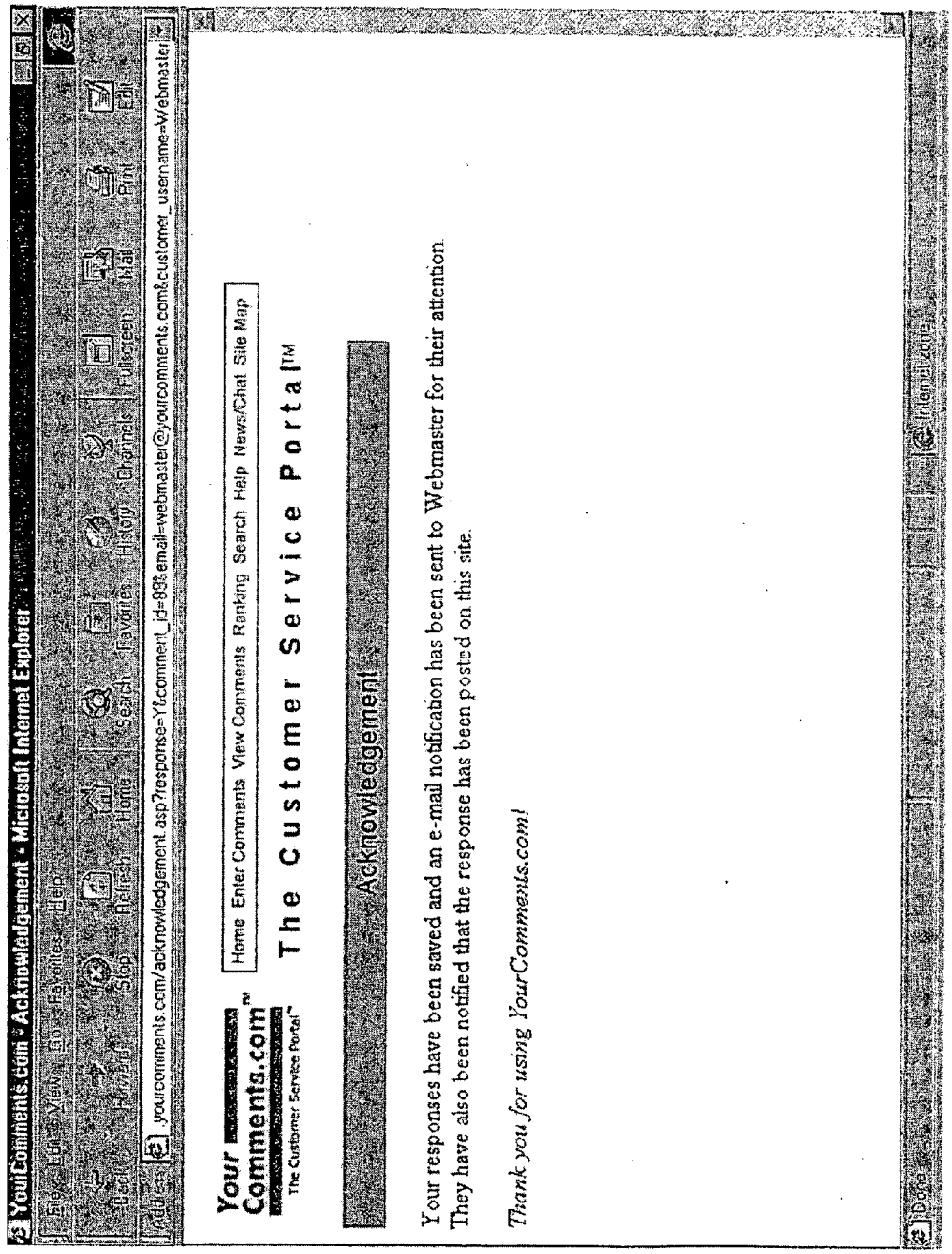
FIG. 8k is an acknowledgement page that is displayed after the company enters a response.
Figure 8I:
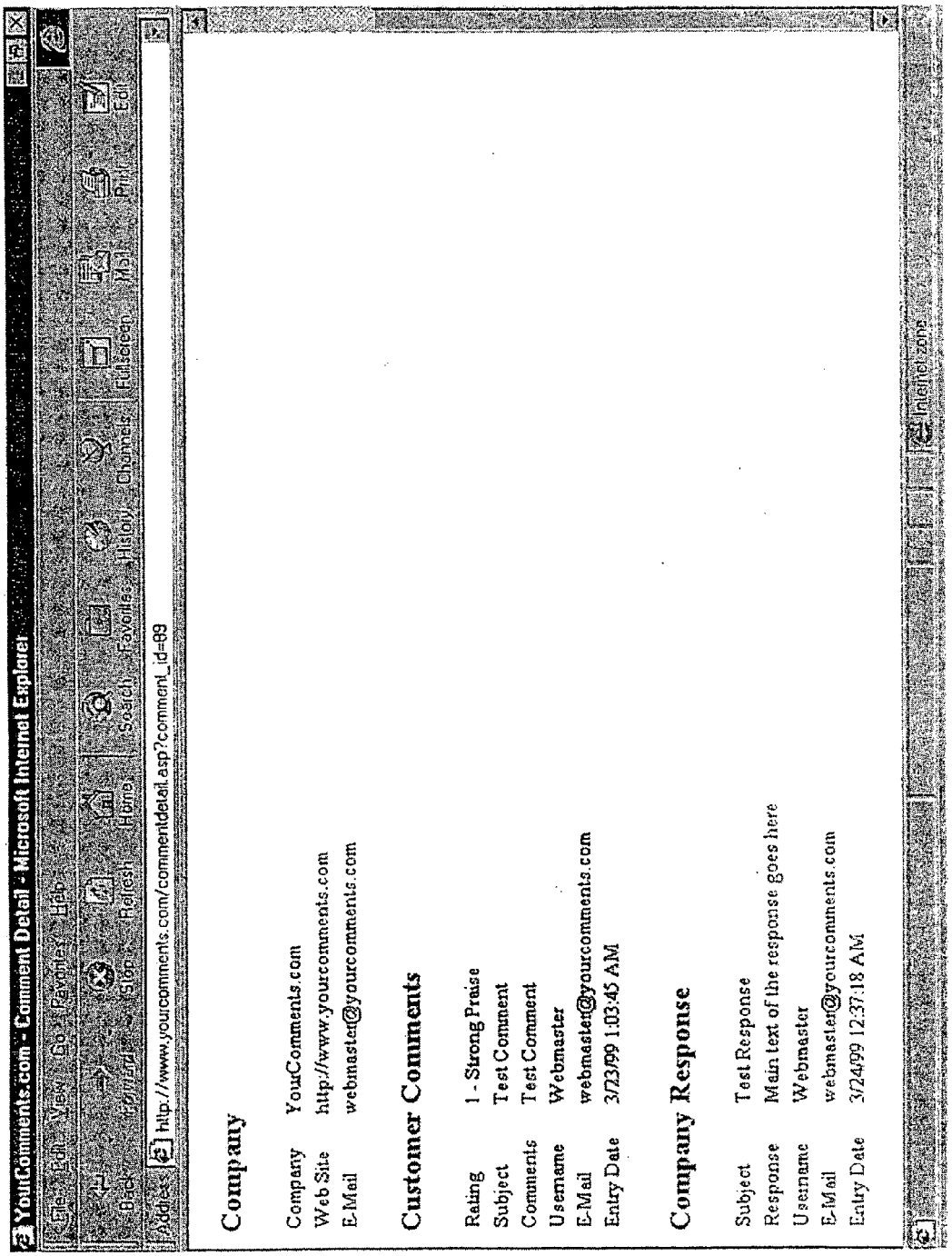
Figure 8N:
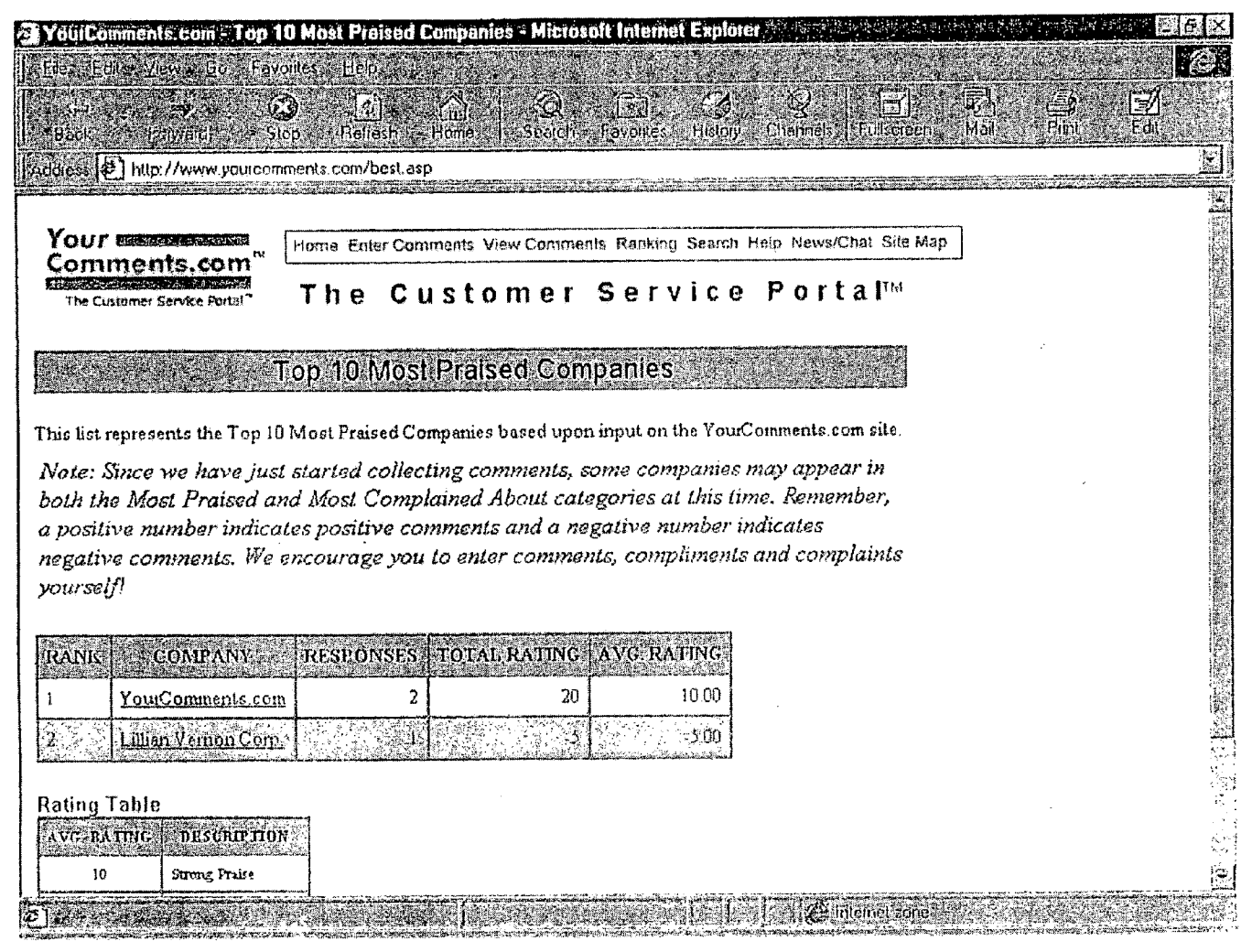

Referring to FIG. 8g, the comment is automatically e-mailed to the company from the server computer 8 database. The company clicks on the hyperlink within the e-mail notification and is taken to a similar comment detail page as previously shown in FIG. 8f. In one embodiment of the method, the company registers on the YourComments.com website by submitting its contact information. Referring to FIG. 8h, the company also enters a username and password. Referring to FIG. 8i, the company enters a response and the response is sent to the server computer 8 via the Internet. Referring to FIG. 8j, an acknowledgment message is sent to the company. Referring to FIG. 8k, a comment detail page is automatically redirected to the company, which displays both the consumer comment and company response.

In another embodiment of the present invention, the server computer 8 stores the company response and triggers consumer notification. Referring to FIG. 8l, notification of the response is automatically e-mailed to the consumer using the contact information the consumer has already provided and which is now stored in the server computer database 8.

Referring to FIG. 8m, the consumer may click on an embedded hyperlink to open the company response so that the consumer may view the response.

After receiving comments about a company, the server computer 8 ranks the company based upon the level of comments. Referring to FIG. 8n, a user, including the company, consumer, or a third party, may view the company ratings.

The above-described process may be repeated by the same consumer and company until the customer service interaction has been satisfactorily resolved or may also be a one-time transaction with input of feedback and a quantitative rating.

Figure 9A:
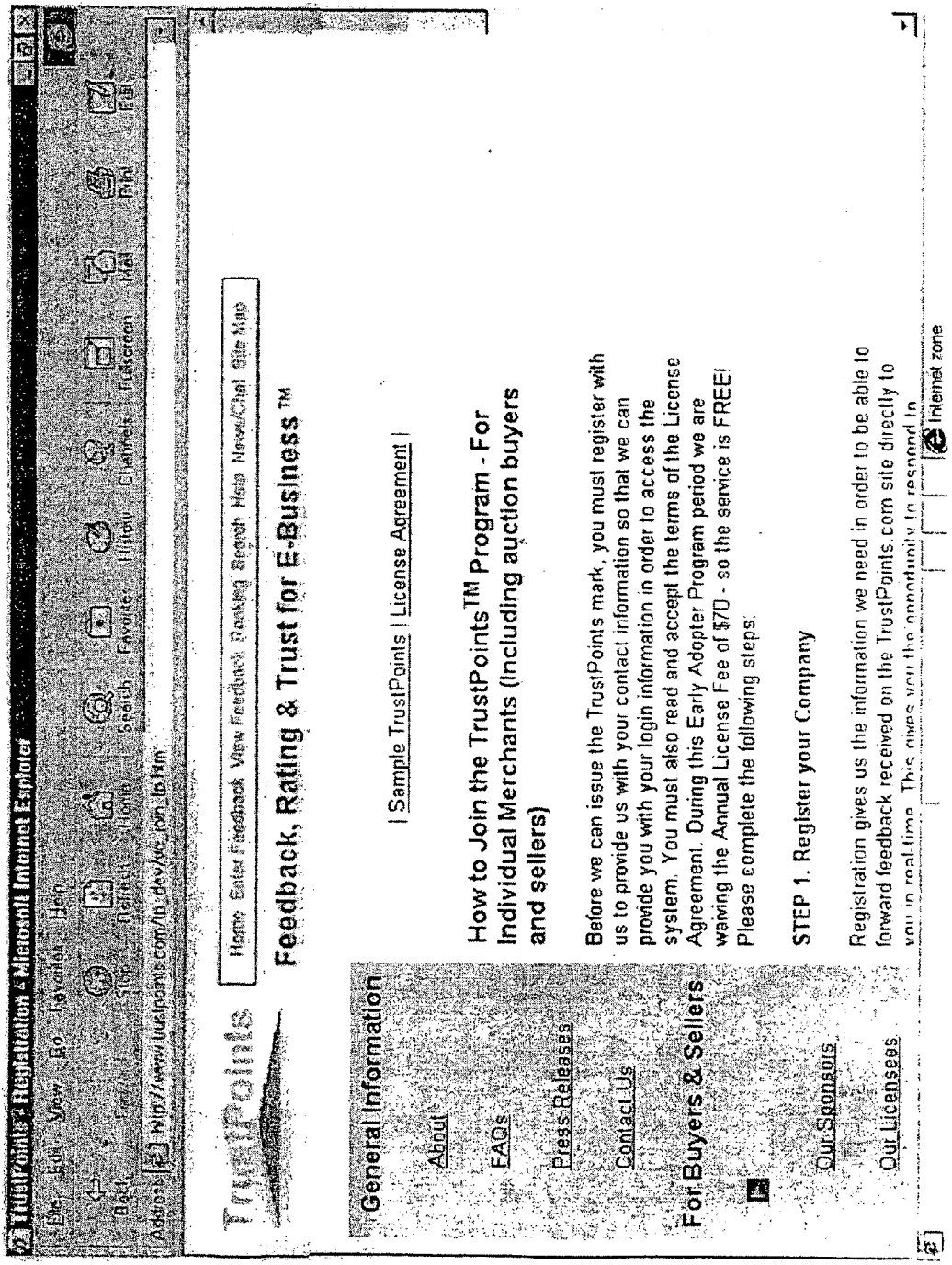
Figure 9B:
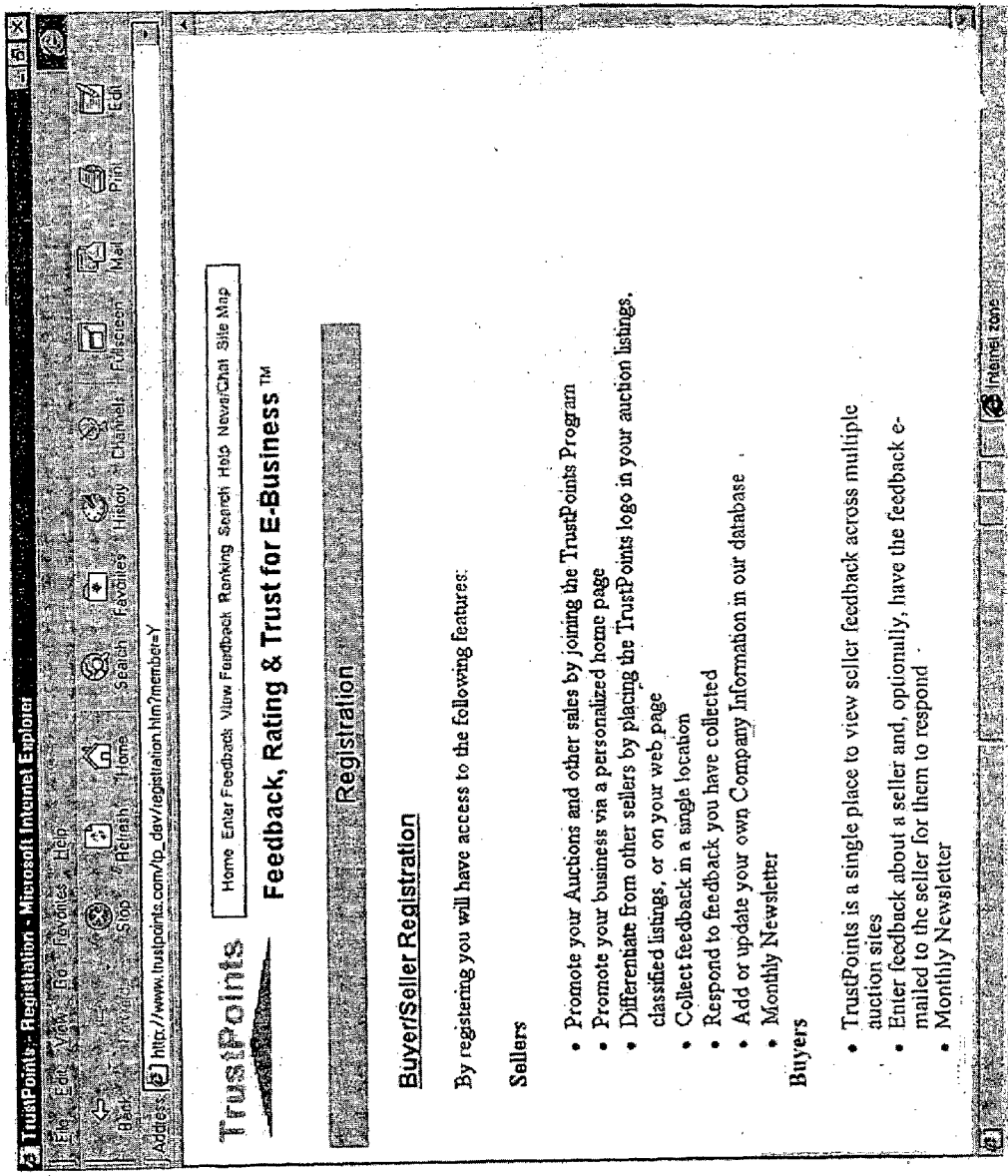

An example of implementation of the points-based program, such as the TrustPoints™ program follows:

Referring to FIG. 9a, in an embodiment of the present invention, a user accesses a website, such as the YourComments.com or TrustPoints.com website, to join a points-based program, such as the TrustPoints™ program. As shown in the screen capture of FIG. 9b, a company or user clicks on the relevant line to register. Referring to FIG. 9c, a screen capture of the registration form, a company representative, would complete the online registration form, and the registration form would be received and stored by the server computer 8.

Figure 9D:
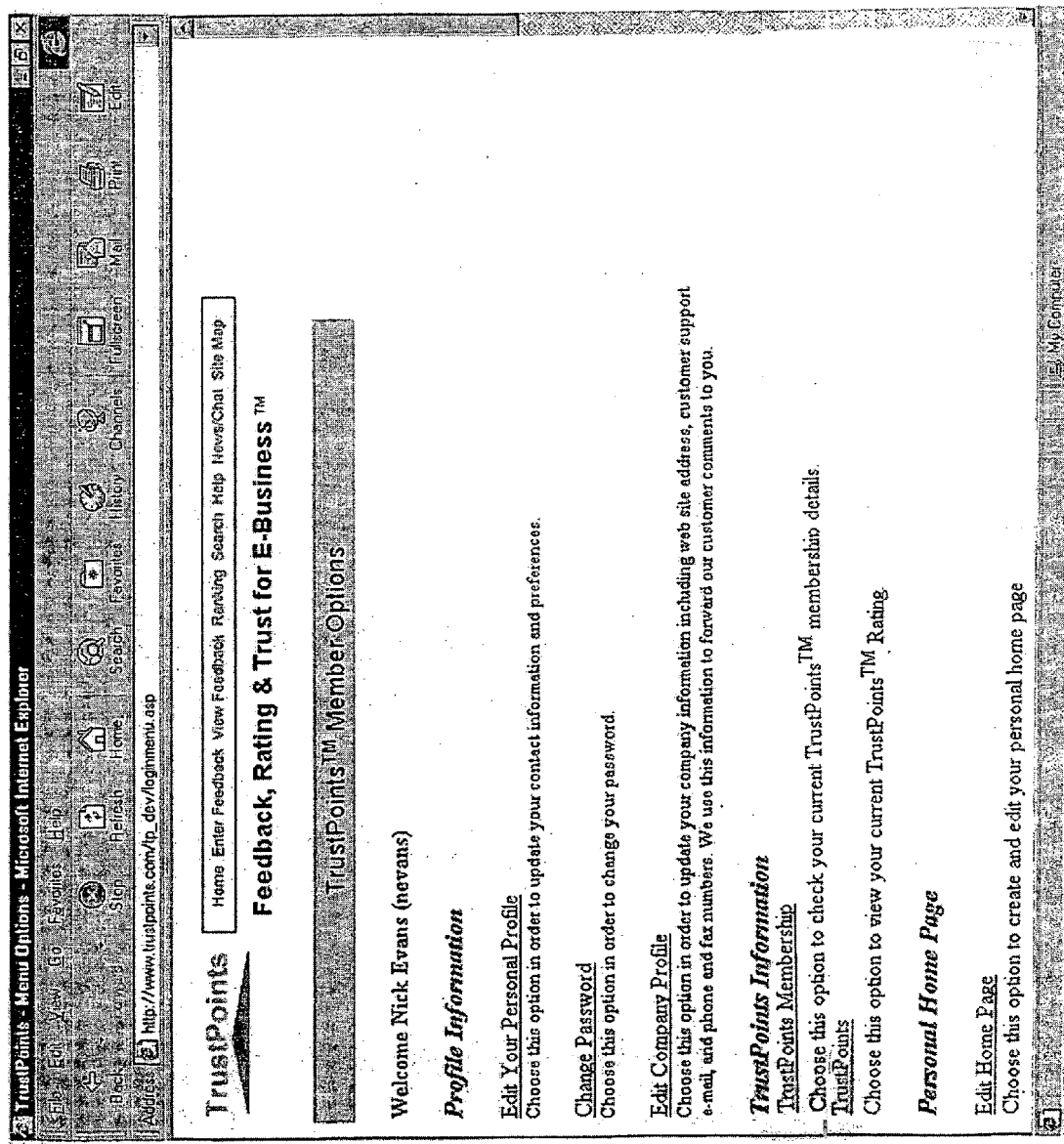

Referring to FIG. 9d, once the membership is activated, a member may access this web page in order to edit their profile information. A member may also check its current membership details and its points-based rating. A member may also create and edit its personal home page.

Figure 9E:
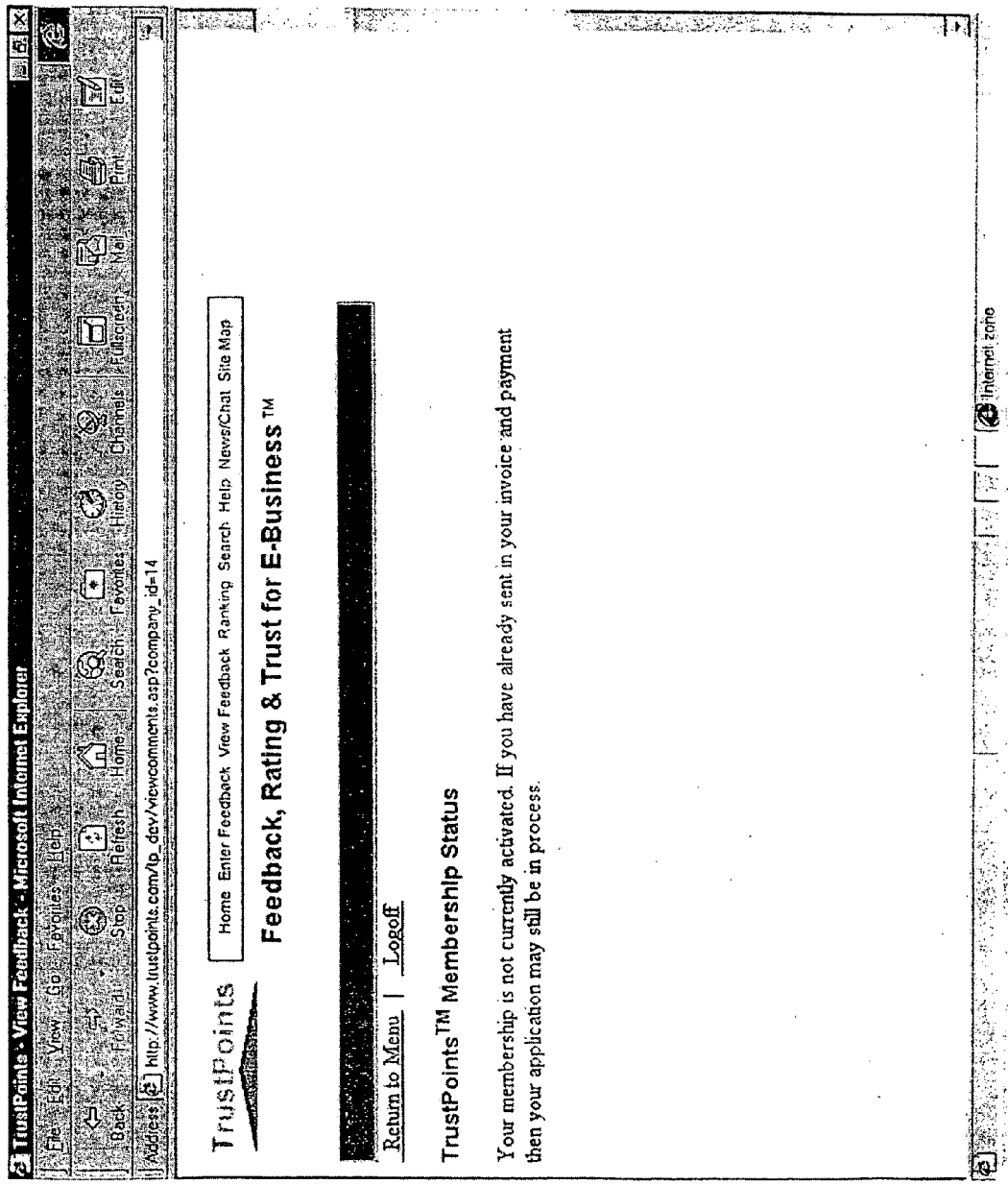
Figure 9F:
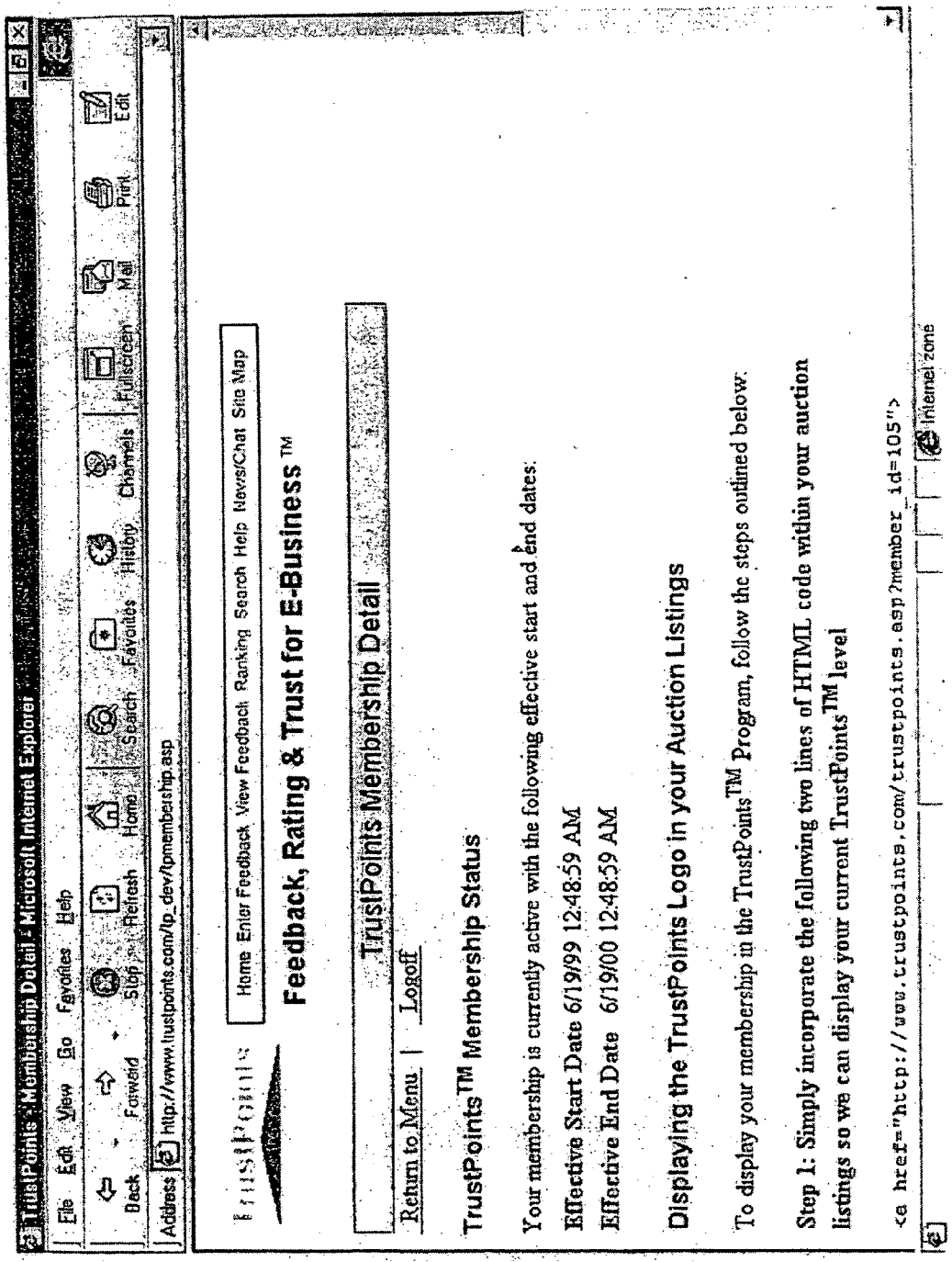

Referring to FIG. 9e, this is a web page that will be displayed if a member's membership information has not yet been activated. However, once the membership status is active, referring to FIG. 9f, in an embodiment of the present invention, this web page will be displayed and the member will then be able to display the YourComments.com TrustPoints™ Logo in its auction listings.

Figure 9G:
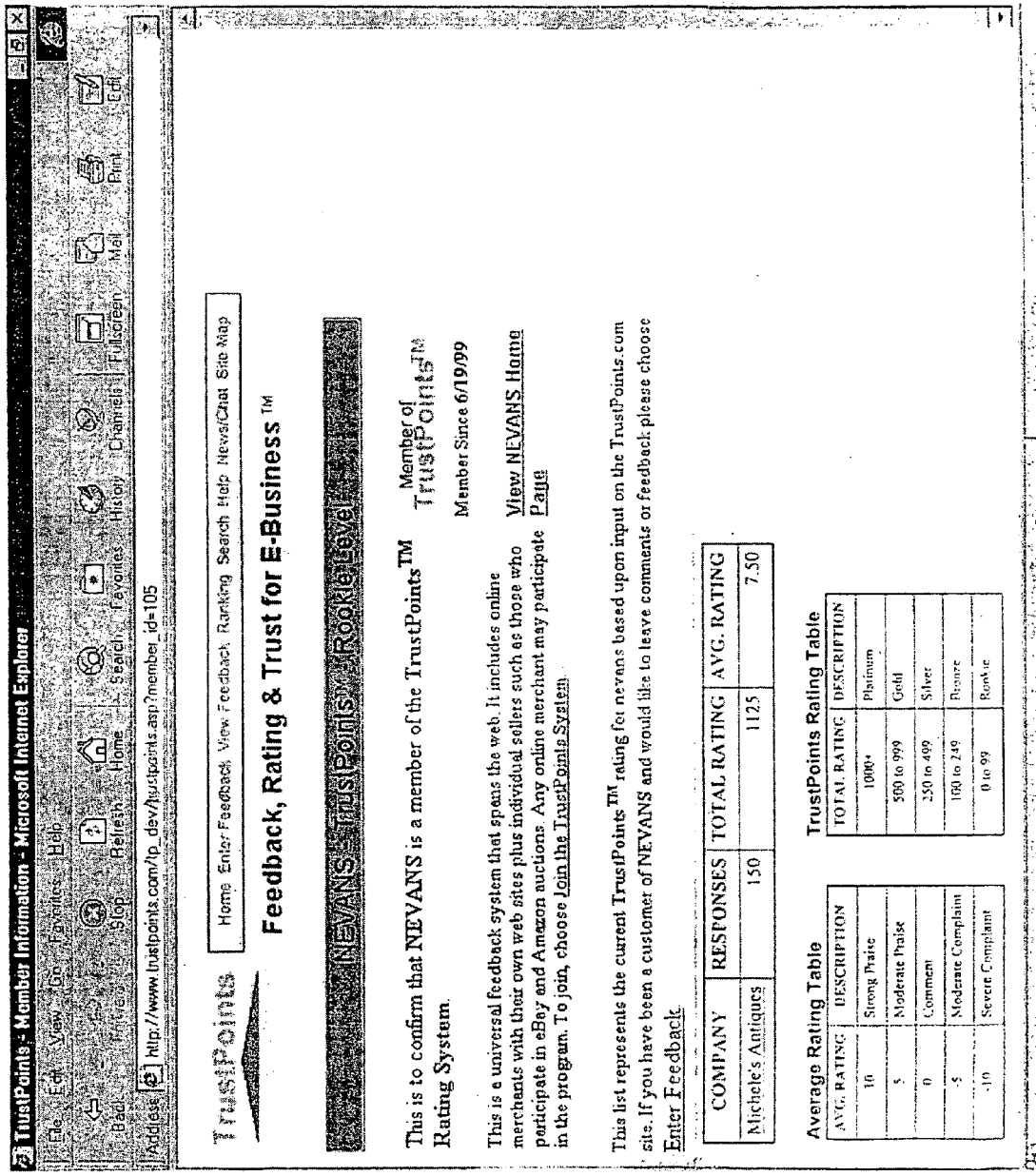

Referring to FIG. 9g, this is a web page that displays a member's points-based rating. According to this example, the company has an average rating of 7.5; therefore, its TrustPoints™ rating falls between the 0 to 99 points category, making it a Rookie. Also, on this particular web page, a user may click on a hyperlink to enter comments about this particular member. In addition, this web page contains hyperlinks to the home pages of buyer and seller's auction websites.

Referring to FIG. 9h, a web page that displays the comments a particular company has received. The screen capture also shows the various comments and ratings the company has received from consumers.

Figure 9I:
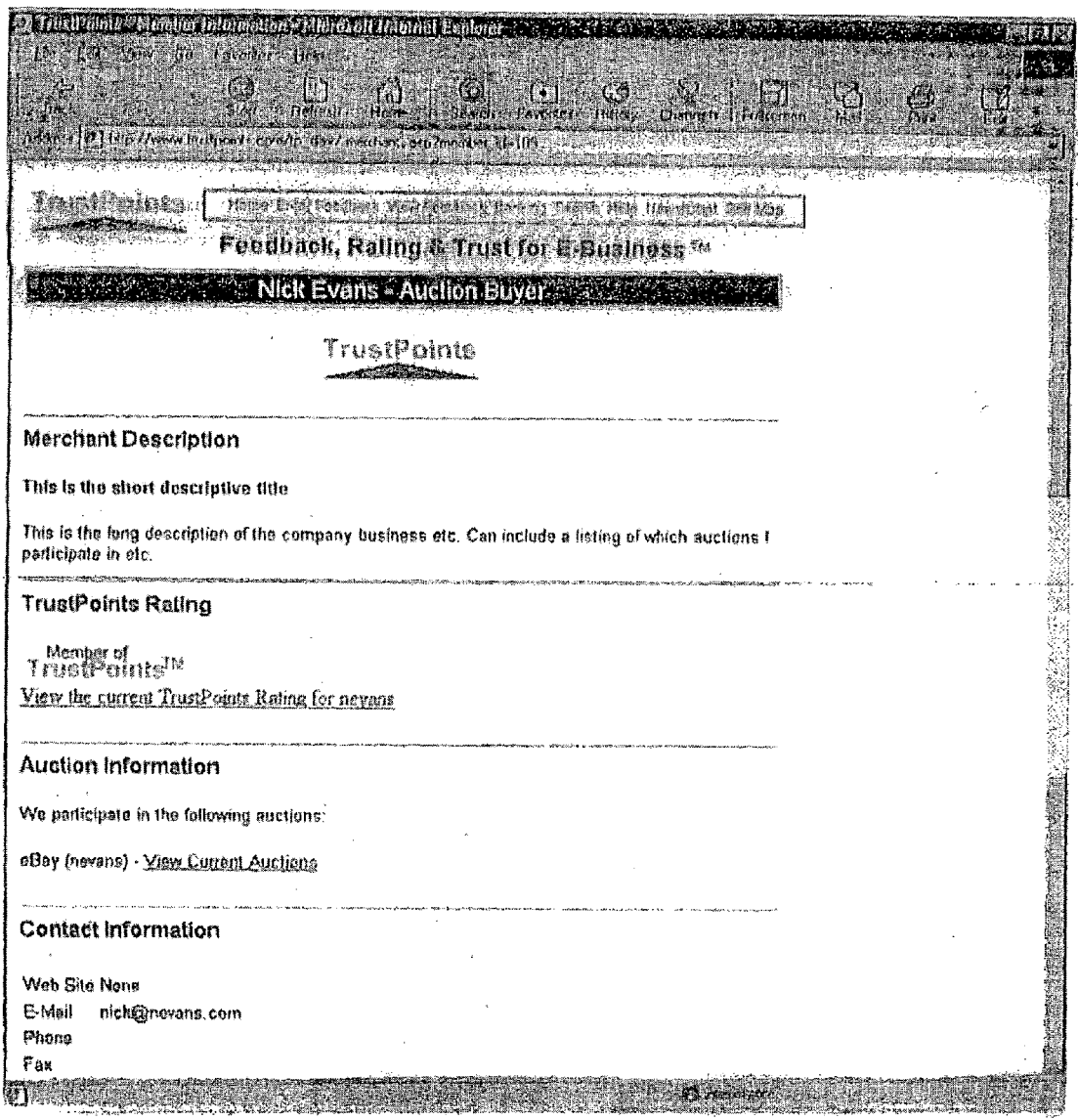

Referring to FIG. 9i, a buyer or seller's home page is linked to the web page described in FIG. 9g. The home page of a buyer or seller contains personalized information, including but not limited to, contact information and provides hyperlinks to the buyer or seller's current auctions, activity and feedback across multiple auction websites.

Referring to FIG. 9j, a TrustPoints™ logo is located on the website of a member of the points-based program, and a user can click on the logo to view information discussed in FIG. 9g.

What is claimed is:

1. A method of providing customer service interactions and rating of customer service via a communications network, comprising:
    accessing an interactive website by a customer;
    inputting by the customer to the interactive website;
    sending by the customer, over the communications network to the interactive website, a comment and a customer service rating by the customer corresponding to a content entered in the step of inputting, the comment and the customer service rating relevant to a customer service provider;
    receiving the comment and the customer service rating at a storage operable in conjunction with a host server of the interactive website;
    storing the comment and the customer service rating in the storage;
    manipulating the comment and the customer service rating in the storage;
    deriving a customer service points score reflecting the comment and the customer service rating, as well as other information and inputs to the storage, including inputs by pluralities of different ones of the customer, relevant to the customer service provider;
    notifying the customer service provider that the comment is in the storage;
    making the interactive website accessible to the customer service provider at a geographic location remote from the storage;
    viewing the rating on the interactive website by the customer service provider at the geographic location;
    viewing the comment on the interactive website by the customer service provider at the geographic location;
    inputting by the customer service provider, to the interactive website, a response to the comment;
    storing the response in the storage; and
    accessing the interactive website by the customer to view the response;
    wherein the steps of inputting and sending by the customer, of receiving the comment and the customer service rating, of notifying the customer service provider, and of inputting by the customer service provider of the response are each performed in substantially real time.

2. The method of claim 1, further comprising:
    notifying the customer that the response to the comment.

3. The method of claim 2, wherein at least one of the step of notifying the customer or the step of notifying the customer service provider comprises sending an e-mail.

4. The method of claim 3, further comprising:
    embedding a hyperlink into the e-mail; and
    accessing the interactive website via the hyperlink, to view the comment.

5. The method of claim 4, further comprising:
    enabling the customer service provider to register at the interactive website;
    registering by the customer service provider; and
    preventing the customer service provider from performing the steps of viewing the rating, viewing the comment and inputting by the customer service provider the response, unless the customer service provider has first successfully completed the step of registering.

6. The method of claim 1, further comprising the step of:
    accessing by the customer to view the response, in substantially real time.

7. The method of claim 6, further comprising pluralities of the steps of receiving the comment and the customer service rating, notifying the customer service provider, and inputting by the customer service provider of the response, and accessing by the customer to view the response, are each performed in substantially real time.

8. A system for providing a customer service intermediary between at least one consumer communication device and a customer servicer communication device across a communication network, comprising:
    a processor;
    a memory device coupled to said processor;
    a communication device coupled to said processor and said memory device, that enables communication via the communication network;
    a database that is stored and updated in said memory device; and
    an application program that is executed by said processor from said memory device comprising:
    first code, responsive to a query from the consumer communication device via said communication device, that instructs said communication device to make accessible by the consumer communication device an interactive website suitable for input of a comment and a rating at the consumer communication device, the comment being deliverable to the communication device coupled to the processor and the memory;
    second code, responsive to receiving the comment and the rating at said communication device, that stores the comment and the rating into said database;
    third code, responsive to receiving the comment and the rating at said communication device, that instructs said communication device to send a notification to the customer servicer communication device;
    fourth code, responsive to receiving the comment and the rating at said communication device, that calculates a point score corresponding to the rating and others of the rating then stored in said database; and
    fifth code, responsive to a query from other than said communication device, that makes accessible the point score as having then been calculated and also makes accessible the comment and any other comments in the database;
    wherein the first code, the second code and the third code each operate in substantially real time.

9. The system of claim 8, the application program further comprising:
    sixth code, responsive to a query from the customer servicer communication device via said communication device, that instructs said communication device to forward a notice of said comment to the customer servicer communication device;
    seventh code, responsive to a registration submitted by the customer servicer communication device via said communication device, that makes operable the eighth and ninth codes;
    eighth code, responsive to a query from the customer servicer communication device via said communication device, that instructs said communication device to authorize access by the customer servicer communication device to the comment; and
    ninth code, responsive to operation of the eight code, that allows the customer servicer communication device to respond to the comment.

10. The system of claim 9, the application program further comprising:
    tenth code, responsive to operation of the ninth code, that instructs said communication device to forward any response from operation of the ninth code to the consumer communication device.

11. A method of providing an interactive customer service system operable via a computer network, comprising:

providing a website communicably connected to the computer network;

communicably connecting a customer device over the computer network, to the website;

inputting a comment by the customer device to the website over the computer network;

providing the website with a notification director;

directing a notification by the notification director, to a customer service provider, in response to the step of inputting the comment;

receiving the notification by the customer service provider;

registering by the customer service provider to view the comment via communications over the computer network by a customer service provider device, communicably connected to the computer network;

viewing the comment by the customer service provider device by communicative connection over the computer network to the website;

inputting a response at the customer service provider device relevant to the comment;

sending the response to the customer device, via the website and the computer network;

wherein the steps of inputting the comment, directing the notification, receiving the notification, viewing the comment, inputting the response, and sending the response are all performed in substantially real time.

12. The method of claim 11, wherein the method allows real time interactive communications between the customer device and the customer service provider device over the computer network.

13. The method of claim 11, further comprising the step of:

determining a point score for the customer service provider, based on pluralities of the comment and the response by varied pluralities of the customer device respecting the customer service provider; and displaying the point score for the customer service provider on the website, accessible over the computer network.

14. The method of claim 13, further comprising the step of:

determining a rank for the customer service provider against criteria; and displaying the rank for the customer service provider on the website, accessible over the computer network.

* * * * *